United States Patent
Ben-Tzvi et al.

(10) Patent No.: US 9,616,948 B2
(45) Date of Patent: Apr. 11, 2017

(54) ACTIVE DOCKING MECHANISM FOR MODULAR AND RECONFIGURABLE ROBOTS

(71) Applicant: Pinhas Ben-Tzvi, Kensington, MD (US)

(72) Inventors: Pinhas Ben-Tzvi, Kensington, MD (US); Pual Marie Moubarak, Dearborn, MI (US)

(73) Assignee: Pinhas Ben-Tzvi, Blacksburg, VA (US)

(*) Notice: Subject to any disclaimer, the term of this patent is extended or adjusted under 35 U.S.C. 154(b) by 83 days.

(21) Appl. No.: 14/639,491

(22) Filed: Mar. 5, 2015

(65) Prior Publication Data
US 2016/0257357 A1   Sep. 8, 2016

Related U.S. Application Data

(62) Division of application No. 13/607,721, filed on Sep. 8, 2012, now Pat. No. 9,004,200.

(51) Int. Cl.

| | |
|---|---|
| *B62D 55/06* | (2006.01) |
| *B62D 55/02* | (2006.01) |
| *B62D 55/065* | (2006.01) |
| *B62D 55/075* | (2006.01) |
| *F16D 43/16* | (2006.01) |

(Continued)

(52) U.S. Cl.
CPC ............ *B62D 55/06* (2013.01); *B62D 55/02* (2013.01); *B62D 55/04* (2013.01); *B62D 55/065* (2013.01); *B62D 55/0655* (2013.01); *B62D 55/075* (2013.01); *B62D 57/00* (2013.01); *F16D 43/16* (2013.01); *Y10S 901/01* (2013.01)

(58) Field of Classification Search
CPC .......................... B62D 55/065; B62D 55/0655
USPC .......................................................... 180/9.1
See application file for complete search history.

(56) References Cited

U.S. PATENT DOCUMENTS

| | | | | |
|---|---|---|---|---|
| 1,473,369 A | * | 11/1923 | Williams | B60S 9/21 180/200 |
| 2,158,891 A | * | 5/1939 | Beacher | B60S 9/14 180/200 |

(Continued)

OTHER PUBLICATIONS

M. Yim, et al."Modular Self-reconfigurable Robot Systems: Challenges and Opportunities for the Future," IEEE Robotics and Automation Magazine, vol. 14, No. 1, pp. 2-11, 2007.

(Continued)

*Primary Examiner* — Kevin Hurley
*Assistant Examiner* — Michael Stabley

(57) ABSTRACT

A robot has a track assembly having tracks configured to move the robot in a first direction and a wheel assembly having wheels configured to move the robot in a second direction orthogonal to the first direction. A toggling assembly switches between the track assembly and the wheel assembly. The robot modules can mate with each other. The robot module has an elongated shaft with a head and a narrow neck. The shaft extends outward from the side of the robot module. A mating robot module has a clamping mechanism with opposing clamps which in an opened position receive the shaft. In a closed position, the clamps define an opening which matches and engages the cross-section of the neck of the elongated shaft. The clamping mechanism has a drive mode to drive the module, a clamping mode for docking, and neutral mode for alignment prior to clamping.

12 Claims, 28 Drawing Sheets

(51) Int. Cl.
*B62D 55/04* (2006.01)
*B62D 57/00* (2006.01)

(56) References Cited

U.S. PATENT DOCUMENTS

| | | | | |
|---|---|---|---|---|
| 2,638,995 | A * | 5/1953 | Gottlieb | B60S 9/21 137/383 |
| 3,029,886 | A * | 4/1962 | Hansen | B60S 9/21 180/200 |
| 3,623,562 | A * | 11/1971 | Pitra | B60S 9/14 180/200 |
| 3,871,129 | A * | 3/1975 | Tong | A63H 17/40 446/437 |
| 4,223,753 | A * | 9/1980 | Bradbury | B60B 9/00 180/21 |
| 4,678,051 | A * | 7/1987 | Dugle | B62B 3/001 104/50 |
| 5,186,270 | A * | 2/1993 | West | B25J 5/005 180/202 |
| 5,515,934 | A | 5/1996 | Davis | |
| 5,868,600 | A * | 2/1999 | Watanabe | A63H 17/36 180/200 |
| 6,084,373 | A | 7/2000 | Goldenberg et al. | |
| 6,450,104 | B1 * | 9/2002 | Grant | B08B 9/049 104/138.1 |
| 6,484,083 | B1 * | 11/2002 | Hayward | B60D 1/00 180/24.05 |
| 6,488,306 | B1 * | 12/2002 | Shirey | B60D 1/00 280/474 |
| 6,523,629 | B1 * | 2/2003 | Buttz | B60D 1/00 180/14.2 |
| 6,605,914 | B2 | 8/2003 | Yim et al. | |
| 6,686,717 | B2 | 2/2004 | Khairallah | |
| 6,725,128 | B2 | 4/2004 | Hogg | |
| 6,726,524 | B2 * | 4/2004 | Yamaguchi | A01B 51/02 446/431 |
| 6,780,042 | B1 | 8/2004 | Badescu et al. | |
| 6,820,653 | B1 * | 11/2004 | Schempf | B08B 9/043 138/97 |
| 6,831,436 | B2 | 12/2004 | Gonzalez | |
| 8,185,241 | B2 * | 5/2012 | Jacobsen | B62D 55/0655 700/1 |
| 8,393,422 | B1 * | 3/2013 | Pensel | B62D 55/0655 180/9.4 |
| 8,851,211 | B2 * | 10/2014 | Schlee | B25J 5/007 180/14.1 |
| 2006/0155388 | A1 | 7/2006 | Pietrzyk | |

OTHER PUBLICATIONS

H. Wei, et al. "Sambot: A Self-Assembly Modular Robot System," IEEE/ASME Trans. on Mechatronics, vol. 16, No. 4, pp. 745-757, 2011.

M. Delrobaei, et al. "Connection Mechanism for Autonomous Self-Assembly in Mobile Robots," IEEE Trans. Robotics, vol. 25, No. 6, pp. 1413-1419, 2009.

P.M. Moubarak, P. Ben-Tzvi. Modular and Reconfigurable Mobile Robotics, J. Robotics and Autonomous Systems, submitted for publication, 2012.

H.B. Brown, et al. "Millibot Train for Enhanced Mobility," IEEE/ASME Trans. on Mechatronics, vol. 7, No. 4, pp. 452-461, 2002.

E.H. Østergaard, et al. "Design of the ATRON Lattice-based Self-reconfigurable Robot" J. Autonomous Robots, vol. 21, No. 2, pp. 165-183, 2006.

V. Zykov et al "Evolved and Designed Self-reproducing Modular Robotics," IEEE Trans. Robotics, vol. 23, No. 2, pp. 308-319, Apr.

G. Ryland et al. "Design of iMobot, an Intelligent Reconfigurable Mobile Robot with Novel Locomotion," in Proc. IEEE Int. Conf. Robotics and Automation (ICRA '10), Alaska, USA.

* cited by examiner

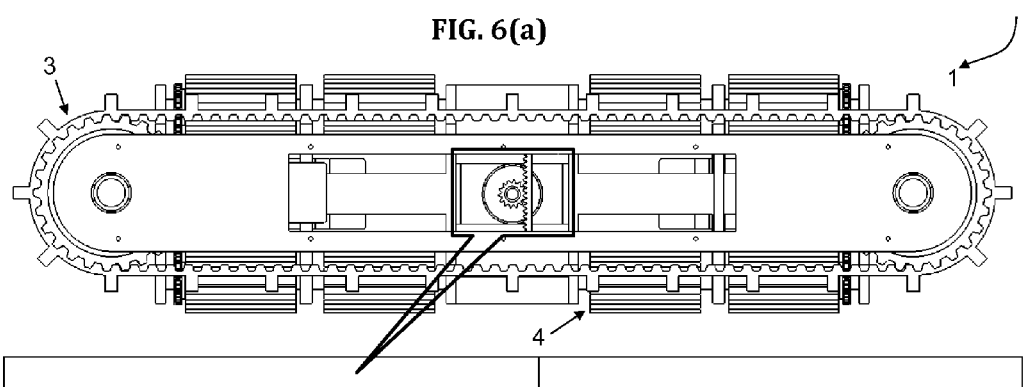
FIG. 6(a)
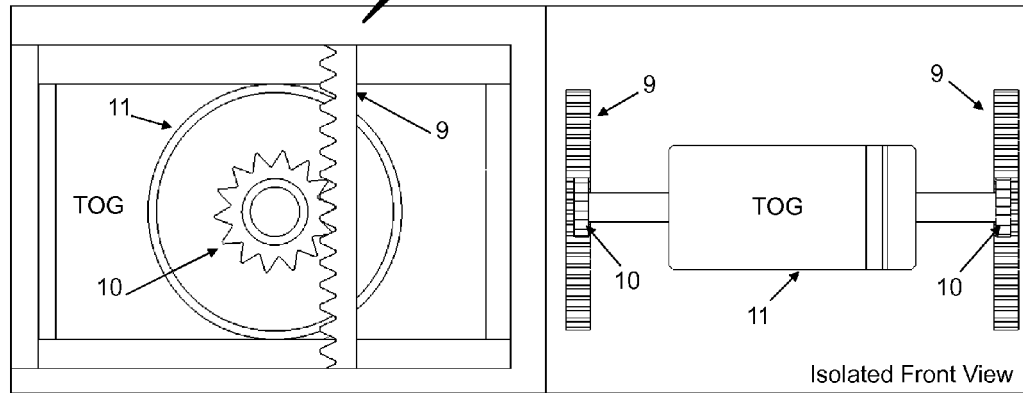
FIG. 6(b)        FIG. 6(c)

ACTIVE DOCKING MECHANISM FOR MODULAR AND RECONFIGURABLE ROBOTS

CROSS REFERENCE TO RELATED PATENT APPLICATION

This patent application is a divisional application to U.S. patent application Ser. No. 13/607,721 filed on Sep. 8, 2012 titled MOBILE ROBORT WITH HYBRID TRACTION AND MOBILITY MECHANISM which is incorporated herein by reference in its entirety.

BACKGROUND OF THE INVENTION

Field of the Invention

The present invention relates to robots. More particularly, the present invention relates to Self-Configurable and Transformable Omni-Directional Robotic Modules.

Background of the Related Art

As discussed in "MODULAR AND RECONFIGURABLE MODULAR ROBOTICS" by Paul M. Moubarak and Pinhas Ben-Tzvi Journal of Robotics and Autonomous Systems, modular robotics refers to a category of robotic systems that are made of interconnecting smaller units called "modules", joined together via docking interfaces. Each module is developed to encompass rudimentary hardware, such as sensors, actuators, computing capabilities and sometimes individual locomotion mechanisms. Because of the docking interfaces that every module carries within its structure, modular robots are often dubbed "reconfigurable" as they possess the ability to scale their capabilities or modify their morphology in response to external stimuli, such as changes in the terrain topology. In contrast to the broader robotic applications, the field of modular robotics is relatively recent with the earliest interest traced back to the late 1980's. Ever since, the research community, realizing the advantages that modular robots possess over rigid-structure counterparts, sustained a gradual progress in the field with researchers from around the world developing ever complex and more versatile modular mobile platforms [1].

Modular robots, in particular mobile platforms, offer significant functional and economical advantages over more traditional single-structure robots. For instance, a modular robot has the ability to adapt to changes in the terrain topography by rearranging the connectivity of the modules. For example, a modular robot can display a wheeled morphology to operate on a flat terrain, a legged morphology to climb stairs, or a snake-like morphology to undulate through tight and narrow spaces. Most importantly, a modular robot has the ability to disconnect individual modules to sneak through tight voids available in a structure (such as a fence or the nibbles of a collapsed building) and to reassemble again once past this obstacle in order to execute a mission. In comparison, for a rigid-structure robot, an unexpected change in the terrain such as the existence of stairs in an urban environment, may compromise its mobility and hinder the success of the assigned mission.

Another advantage of modular robots is scalability. A modular robot can scale its capabilities by docking additional modules together in a reconfigurable architecture. Scalability can be achieved at different levels, such as power scalability, where additional docked modules provide additional overall power to execute a mission that otherwise a single module is unable to accomplish. Scalability can be achieved at the level of mobility.

In addition, the modular nature of reconfigurable robots allows the quick repair of faulty parts, which is often executed by undocking the module that contains the defected part and docking a new stand-by module; a process that can be executed autonomously. This characteristic is especially useful for extreme applications where human intervention is not possible, such as deep space and deep sea exploration.

Yet another advantage of modular robots is task-sharing. The original concept of modular robotics stemmed from the common understanding that a group effort is more effective than an individual effort. Thus, modular robots in some configurations, can operate in swarms of individual modules during exploratory missions, or can assemble together in an architecture to execute a task that otherwise an individual module is unable to accomplish [2].

Still further modular robots are built from one (or few) rudimentary building block that can be mass-produced. This can potentially lower the cost of individual modules, thereby allowing the development of complex robotic structures at an economically competitive cost.

SUMMARY OF THE INVENTION

Accordingly, it is an object of the invention to provide a robot with omni-directional movement. It is another object of the invention to provide a robot which has a tracked unit and a wheeled unit, and a toggling mechanism for operatively selecting between the tracked unit and the wheeled unit. It is yet another object of the invention to provide robot modules which dock with one another and with a manipulating module. It is still a further object of the invention to provide robot modules which can dock together under variable terrain conditions. It is another object of the invention to provide robot modules which can dock together and rotate with respect to each other.

In accordance with these and other objectives of the invention, a robot is provided which is omni-directional. The robot has a track assembly having tracks configured to move the robot in a first direction and a wheel assembly having wheels configured to move the robot in a second direction substantially orthogonal to the first direction. A toggling assembly operatively switches the robot between the track assembly and the wheel assembly by raising and lowering the wheel assembly with respect to the track assembly.

The robot modules are also able to engage each other. Each or some robot modules can have an elongated shaft which extends outward from the robot module. The elongated shaft has a head and a narrow neck with a hexagonal cross-section. Each or some robot modules can also have a clamping mechanism. The clamping mechanism in an opened position receives the shaft. In a closed position, the clamping mechanism defines an opening which matches the hexagonal cross-section of the neck of the elongated shaft. Once the neck of the elongated shaft is clamped within the clamping mechanism, the shaft is fixed with respect to the clamping mechanism. This creates a revolute joint which enables the robot modules to rotate with respect to each other.

The clamping mechanism is also coupled with the drive train of the robot. In a drive mode, the clamping mechanism is fully opened to engage the drive train so that the robot can move. In a clamp mode, the clamping mechanism is fully closed to clamp to the extended shaft of a mating robot module. In a neutral mode, the clamping mechanism is not fully opened or closed, so that the clamping mechanism can be better aligned with the extended shaft of the mating robot module and/or with the mating gear of the drive train.

BRIEF DESCRIPTION OF THE DRAWINGS

These and other objects of the invention, as well as many of the intended advantages thereof, will become more readily apparent when reference is made to the following description, taken in conjunction with the accompanying drawings.

FIG. 6(a) is a side view of the locomotion module of FIG. 1 with a cutaway of the track to illustrate the toggling mechanism (TOG) with rack and pinion details;

FIG. 6(b) is an enlarged view of the TOG mechanism of FIG. 6(a) which enables the switching between the forward/backward mobility using the tracked units, and the sideways mobility using the wheeled units;

FIG. 6(c) is an isolated front view of the TOG mechanism of FIGS. 6(a), (b);

DETAILED DESCRIPTION OF THE PREFERRED EMBODIMENTS

Figure 1:
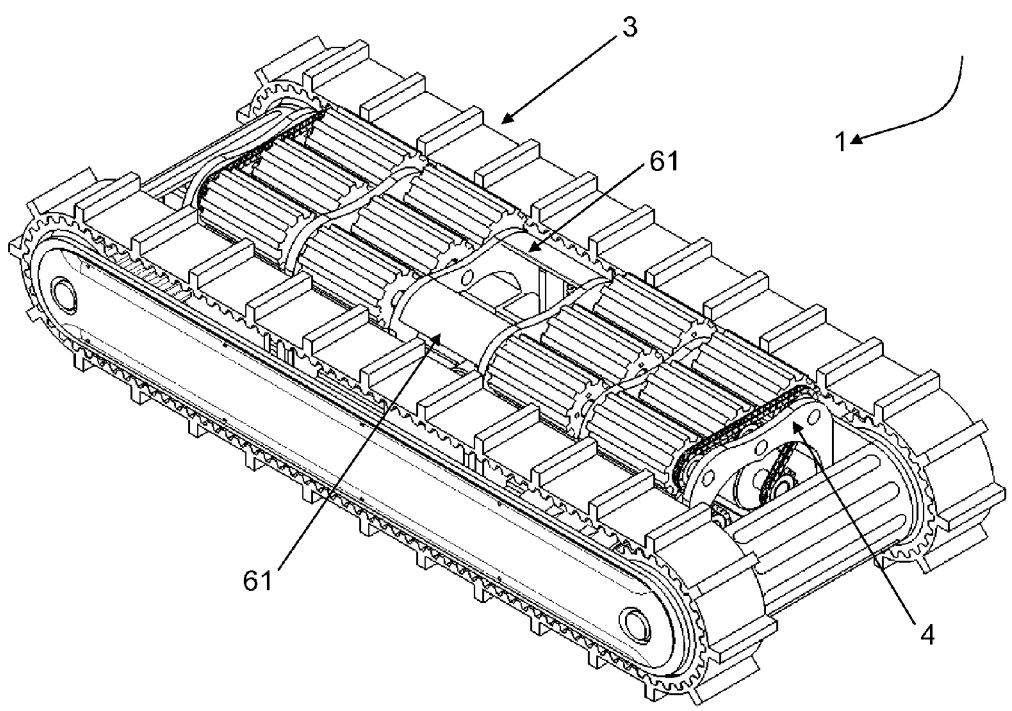
FIG. 1 is a perspective view of the locomotion module for the Self-configurable and Transformable Omni-directional Robotic Module (STORM) system with the tracked units and the wheeled unit cascaded in the center of the module, in accordance with one preferred embodiment of the invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose.

Turning to the drawings, FIG. 1 shows the locomotion module of the Self-configurable and Transformable Omni-directional Robotic Module (STORM) in accordance with the present invention. The STORM represents a modular robot with an invertible morphology that combines wheeled/tracked omni-directional mobility in a versatile reconfigurable structure. The main building blocks of STORM are locomotion modules 1.

Locomotion Module

The locomotion module 1 (FIGS. 1, 2) is generally elongated and includes two tracked units 3 connected by cross-members that create an internal space where the wheeled unit 4 is cascaded in the center of the two tracked units 3. A frame of the locomotion module 1 is formed by the active pulleys 5, passive pulleys 6, and the front and rear cross-members. The tracked unit 3 and the wheeled unit 4 have a low, relatively flat profile, and orthogonal axes of motion in a way to provide omni-directional mobility to the module 1, i.e. forward/backward (FIG. 3) and lateral sideways mobility (FIG. 4), without any prior internal steering. The tracked units 3 are responsible for the forward/backward (F/B) mobility while the wheeled unit 4 provide the sideways mobility. Other general applications of the locomotion module 1 can be seen in mobility devices that require versatile locomotion on different terrain topologies. Specifically, the locomotion module 1 can be used as the fundamental mobility platform for mobility assistive devices operating in a real and unstructured environment, such as wheelchairs or Segways.

Figure 3:
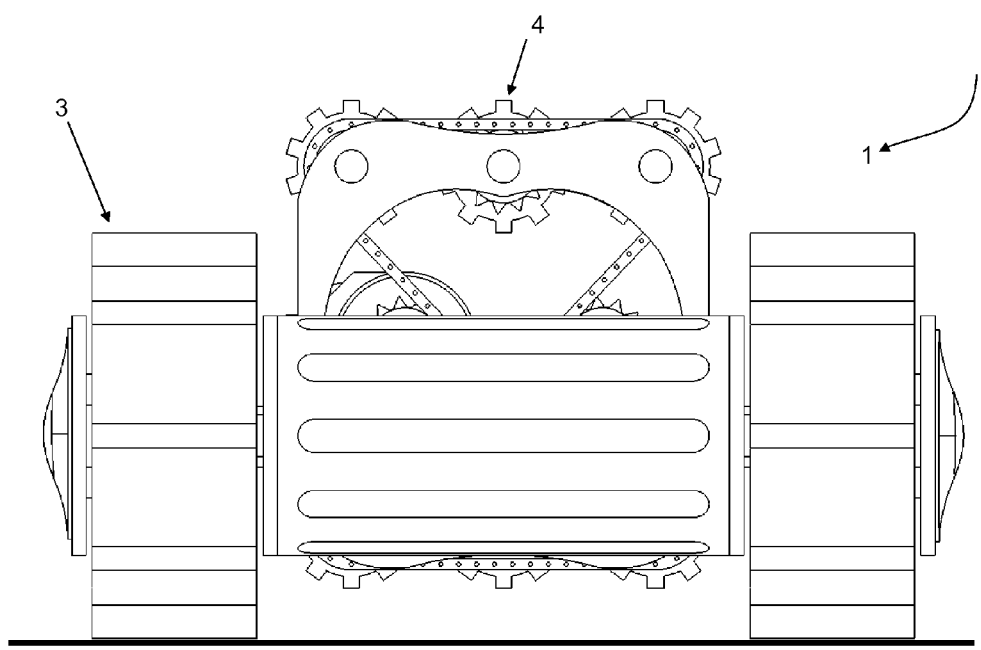
FIG. 3 is a front view of the locomotion module of FIG. 1 showing forward/backward movement when the tracked units are deployed and the wheeled unit is maintained at a safe distance above the ground.
Figure 4:
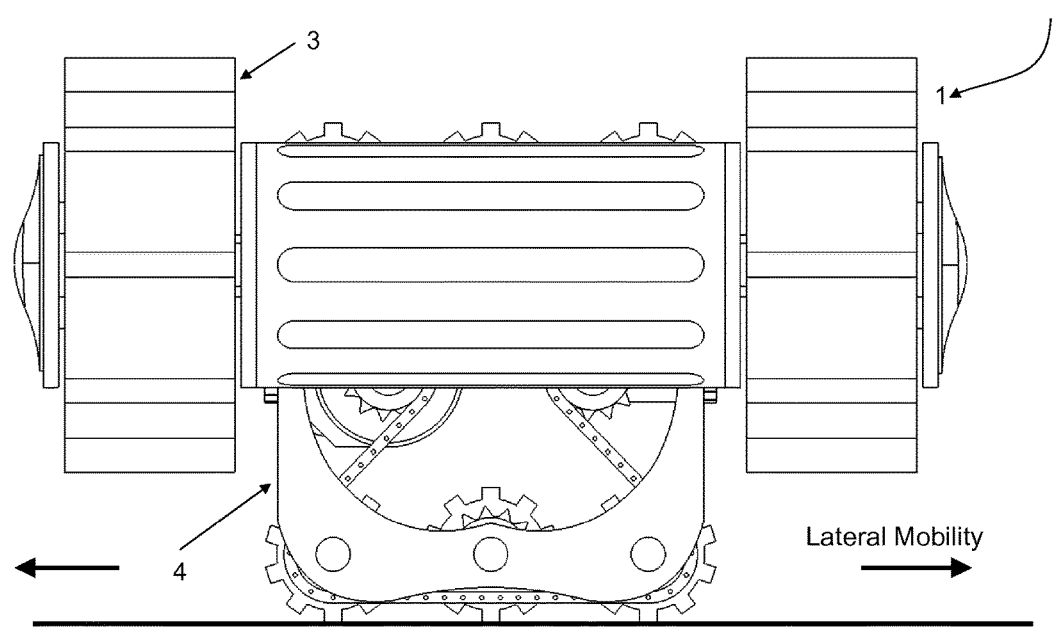
FIG. 4 is a front view of the locomotion module of FIG. 1 showing lateral/sideways movement with the wheeled unit deployed and the tracked units maintained at a safe distance above the ground.

Switching between the forward tracked mobility and the sideways wheeled mobility is achieved by a toggling mechanism called TOG (FIG. 6), which translates the wheels unit up and down along the vertical axis. Lifting the wheeled unit 4 up along the vertical axis allows the locomotion module 1 to deploy the tracked units 3 for forward/backward mobility (FIG. 3). In contrast, pushing the wheels unit 4 against the ground would lift the tracked units 3 in the air allowing the locomotion module 1 to perform sideways mobility using the wheeled unit 4. These three degrees of freedom (longitudinal mobility, sideways mobility and vertical displacement) enable the locomotion module to accomplish three-dimensional motion along three orthogonal axes.

Tracked Units

Figure 5:
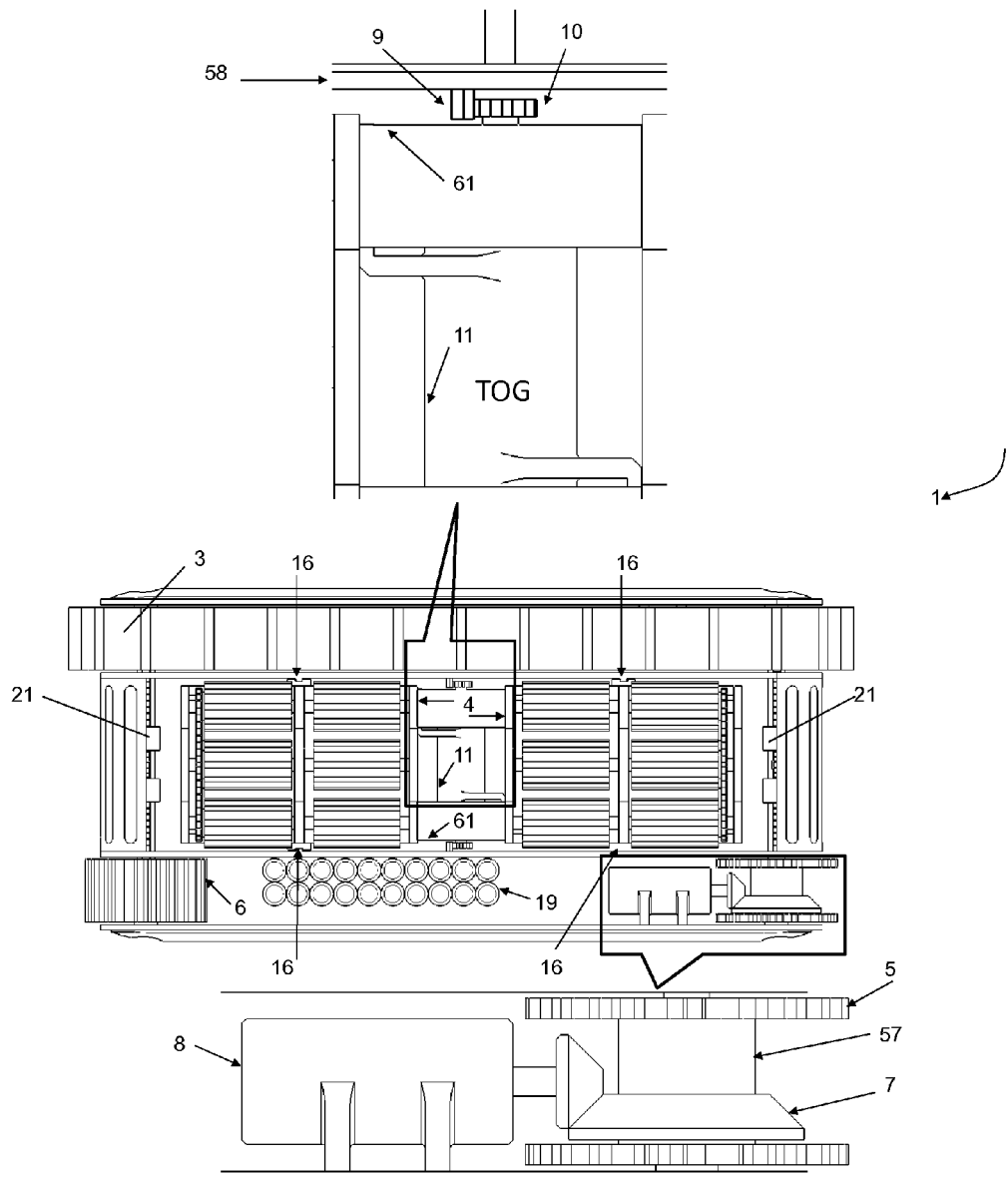
FIG. 5 is a top view of the locomotion module of FIG. 1 with a cutaway of one track and an enlarged view to better illustrate operation of the timing-belt driving mechanism with split active pulleys, motor assembly and bevel gear transmission.

Each of the tracked units 3 of the locomotion module 1 contains a timing belt (i.e., the track) driven by two pulleys; one passive pulley 6 and one active pulley assembly 5, the latter being actuated by an electrical motor assembly 8 (motor, sensors, brakes) via a gearbox transmission and bevel gear 7 (FIG. 5). This motor actuation transmits torque directly to the track through the active pulley 5, which pulls the tracks and generates the forward/backwards mobility of the locomotion module 1. The pulley 6 is accordingly driven by the tracks and guides their longitudinal motion. To reduce space and maintain compatibility of the locomotion module 1, the two active pulleys 5 are split in the center into two pulleys connected together through a common central shaft 57 (FIG. 5) and supported by two bearings, one at each side plate 58. For every tracked unit 3, two plates 58 assembled together through cross-bars, constitute the outer frame of the unit where all related components are lodged. The bevel gear 7 is rigidly connected to the central shaft. Thus, any rotation of motor 8 is transmitted directly to the active pulley assembly 5 and subsequently to the timing belt. Each locomotion module contains two tracked units 3 driven independently from one another at different (or same) speeds in the same direction, or alternatively in opposite directions. In the latter case, this allows the steering of the locomotion module 1 (when omni-directional mobility is not desirable) using differential drive when the tracked units 3 are deployed. The motor assembly 8 of every tracked unit 3 is actuated electrically using batteries 19 housed inside the unit under the timing belt.

Wheeled Unit

Figure 7:
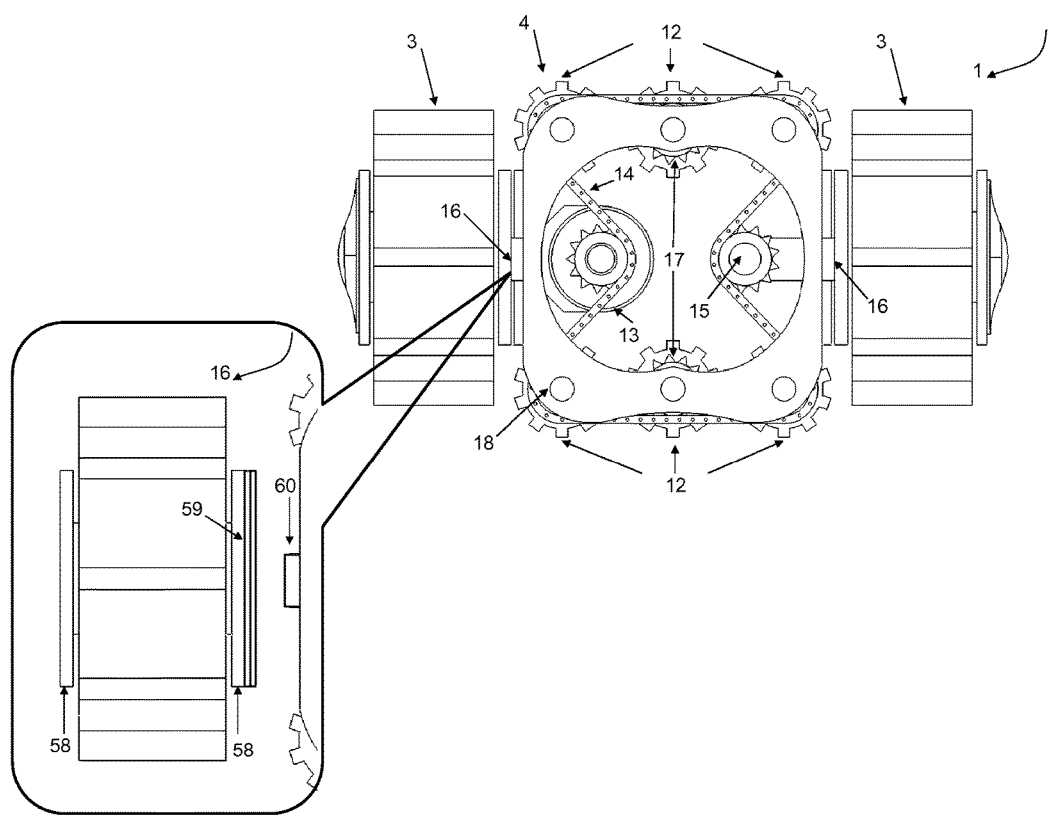
FIG. 7 is a front view of the locomotion module of FIG. 1 showing the wheeled unit with the chain transmission that drives the wheels and the linear guides that maintain alignment of the wheeled unit during vertical motion and details of the guide and rail assembly.

The wheeled unit 4 (FIG. 2, 7) contains two symmetric wheel sections (left and right) connected together rigidly in the center of locomotion module 1. Each section carries an array of six shafts 18 and twelve wheels 12, packed closely together in order to maximize the contact area with the ground and increase STORM's payload capabilities on soft and rugged terrain during wheeled mobility. Thus, the wheeled unit 4 contains a total of twenty-four wheels 12 for a total of twelve actuated shafts 18, whereby every pair of wheels 12 is driven by one shaft 18. For every wheel section, a central motor assembly 13 housed inside the section (FIG. 2), drives the chain 14 which transmits the torque to all six shafts 18 via the sprockets 17 (FIG. 7). Every shaft 18 carries one sprocket 17 at its extremity. Tension of the chain 14 is maintained by an adjustable tensioner mechanism 15 accommodated inside the wheel section. The location of the sprocket 17 of the tensioner mechanism 15 with respect to the chain 14 is adjusted inside a rectangular groove to maintain appropriate tension. The sprocket 17 is bolted to the frame of the tensioner mechanism 15 with a flanged nut.

Electrical power for the motor assembly 13 of the wheeled unit 4 is provided by the same interconnecting leads to batteries 19 (FIG. 5) that extend from the tracked unit 3 into the wheeled unit 4. Vertical alignment of the wheeled unit 4 is accomplished by a set of four linear guide and rail assemblies 16, two for every wheeled unit 4 (FIG. 7). The rail 59 is held stationary by being connected to the frame 58 of the tracked unit 3, while the linear guide 60 is movably connected to the frame of the wheeled unit 4. Each wheel section is supported by two assemblies 16, one on each side. The guide and rail assembly 16 allows the translation of the wheeled unit 4 along the vertical axis and prevent any misalignment during the process of vertical translation.

The tracks 3 and the wheels 4 are used alternatively depending upon the topology of the terrain. In general, the tracks 3 provide a higher traction on unstable and rugged terrain such as sand or mud, as they distribute the load of the robot over a larger surface which reduces the pressure exerted on the ground. However, such mobility mechanism is not power efficient because of the larger contact surface with the ground which increases the rolling resistance forces. This rolling resistance further reduces the speed of the robot when deploying the tracked units for mobility.

The wheels 4 on the other hand are better suited for mobility on a smooth surface such as pavement or tiles. Because of the smaller contact surface between the wheel circumference and the ground, the rolling resistance is minimized which increases the speed of the robot and minimizes the power consumption. However, wheels do not constitute an efficient mobility mechanism on unstable and rugged surfaces (such as sand) where they tend to sink in unstable ground. As such, combining both mobility mechanisms (wheels and tracks) enables the locomotion module to operate efficiently on all terrains by deploying the mobility mechanism that is most suited for the terrain condition. For instance, on paved surfaces, the locomotion module can deploy the wheeled units which enable fast mobility and reduce power consumption. On rugged terrain however, the tracked units can be deployed in order to prevent the module from sinking into unstable soil, or getting stuck on non-geometric obstacles (such as rocks and bumps) along the way. In order not to lose the characteristic of tracks which spread the load of the module over a larger surface and minimize the risk of sinking in unstable soil, an array of wheels is used all along the wheeled unit in order to increase this contact surface. This approach provides stable wheeled mobility to the robot in addition to a larger contact surface during wheeled mobility, which minimizes the risk of sinking.

The wheeled unit 4 is designed to fit the application of the locomotion module 1. The wheeled platform, which is cascaded in the central space created by the two tracked units 3, contains two independent and identical wheeled units 4 connected rigidly together at the center of the module by four rigid curved bars 61 (FIGS. 1, 2), two at the top and two at the bottom. The distribution of the wheels at the top and the bottom of every wheeled unit 4 maintains the structural symmetry of the locomotion module 1. This symmetry enables the locomotion module 1 to maintain mobility under flip-over conditions during tracked and wheeled mobility.

Figure 2:
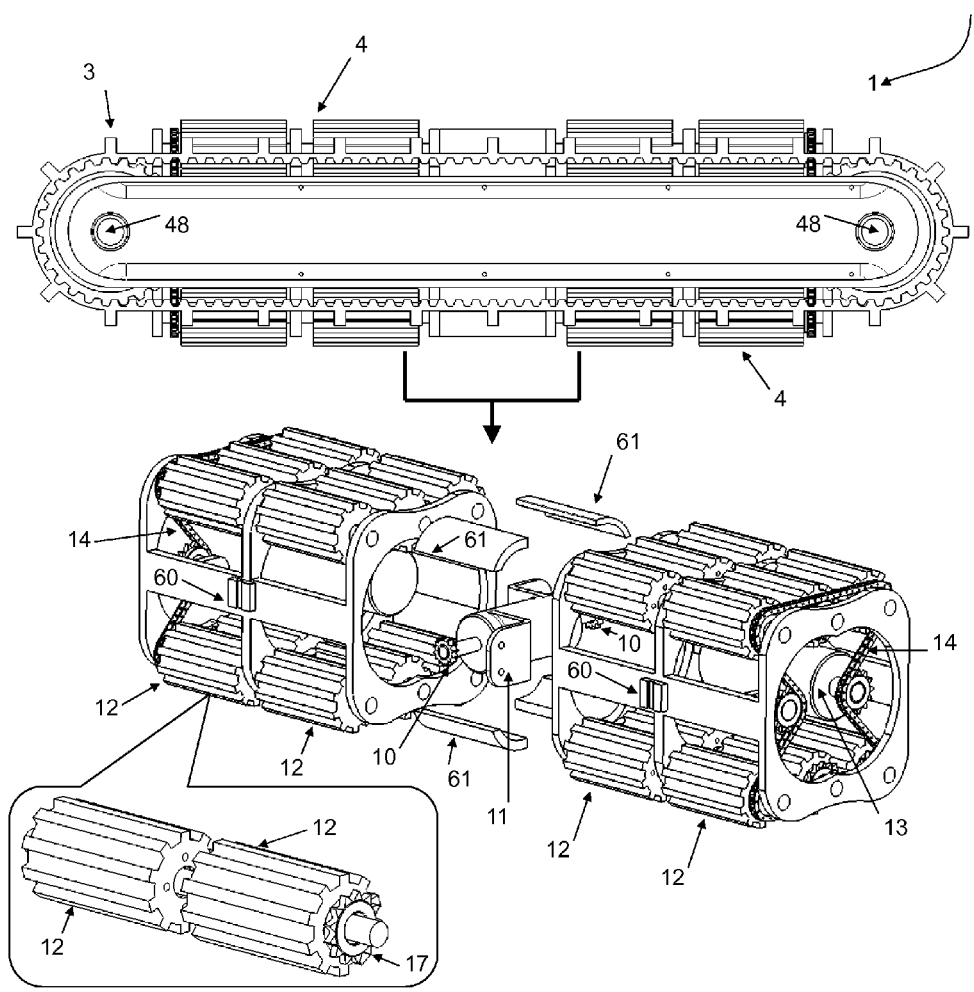
FIG. 2 is a side view of the locomotion module of FIG. 1 with tracked units and wheeled unit and the T-Mech shafts of the docking interfaces on both extremities of the module, and a partially exploded view of the connection between the wheeled units.

Every wheeled unit 4 contains 12 wheels which are all actuated at the same time by a single motor 13 through a chain 14 and sprockets 17 (FIG. 7). Every row of two wheels is thus rotated by a single shaft 18 which extends along the longitudinal axis of the locomotion module 1, and which is supported by the frame of the wheeled unit 4 through ball bearings. The shaft 18 is driven by the chain 14 through one sprocket 17 which is rigidly connected to one extremity of the shaft 18 (FIG. 2). Because every one of the two wheeled units are actuated independently via the motor assembly 13, it is possible to steer the locomotion module during wheeled mobility via differential drive, in a fashion similar to the steering maneuvers of the locomotion module during tracked mobility. Because of the need to steer the locomotion module 1 differentially during wheeled mobility, every wheeled unit 4 is configured to carry six shafts 18 which are together driven by a single motor 13, independently from the other six shafts 18 that are carried by the adjacent wheeled unit 4.

As shown, the non-limiting preferred embodiment of the invention provides that the center unit 4 is made of up an array of wheels which face substantially perpendicular to the outer unit 3 which is made up of tracks. The wheels are best suited for the center unit since they can be better positioned in a small amount of space. It should be appreciated, however, that the invention need not be configured in this manner. Thus, for instance, the center and outer units can both be tracks or both be wheels, and can face in parallel directions.

Toggling Mechanism (TOG)

The toggling mechanism TOG (FIGS. 2, 6) contains a single motor assembly 11, two racks 9 and two pinions 10, and is located at the center of the locomotion module 1. The motor assembly 11, which includes a central motor cascaded between two gearboxes, provides two symmetric shaft extensions for dual support, one from the front of the motor assembly and the other from the back (FIG. 6c). Each of these shaft extensions carries a pinion 10 at its end. The motor assembly 11 carrying the pinions 10 is housed inside the central space created by the arm bars 61 that connect the two wheeled unit 4 (FIG. 5). The motor assembly 11 is rigidly connected to the frame of the wheeled units 4 by bolts and brackets. In contrast, the racks 9 are rigidly connected to the frame of the tracked units 3 through screws (FIG. 5).

The racks 9 and the pinions 10 convert the rotation of the motor assembly 11 into a vertical translation (along the racks) of the assembly 11, and subsequently of the wheeled unit 4 as the wheeled unit 4 is carried by the motor assembly 11. The TOG is the motorized motor/gearbox/pinion/rack assembly that drives the two wheeled unit 4 up and down. The rail and track assemblies 16 are passive elements that guide this translation. Clockwise motor rotation achieves vertical upward translation of the wheeled unit 4, while counter-clockwise rotation achieves vertical downward translation. The static position of the wheeled unit 4 along the racks (when the motor assembly 11 is not actuated) is maintained by the static torque generated by brakes coupled directly to the motor shafts (or other static braking means such as worm and worm gear assemblies that may be a part of the torque amplification stages supplementing the amplification accomplished by the gearboxes.). The motor assembly 11 is powered by the batteries 19 via interconnecting leads that extend from the tracked units 3 into the wheeled unit 4.

Manipulation Module

Figure 8:
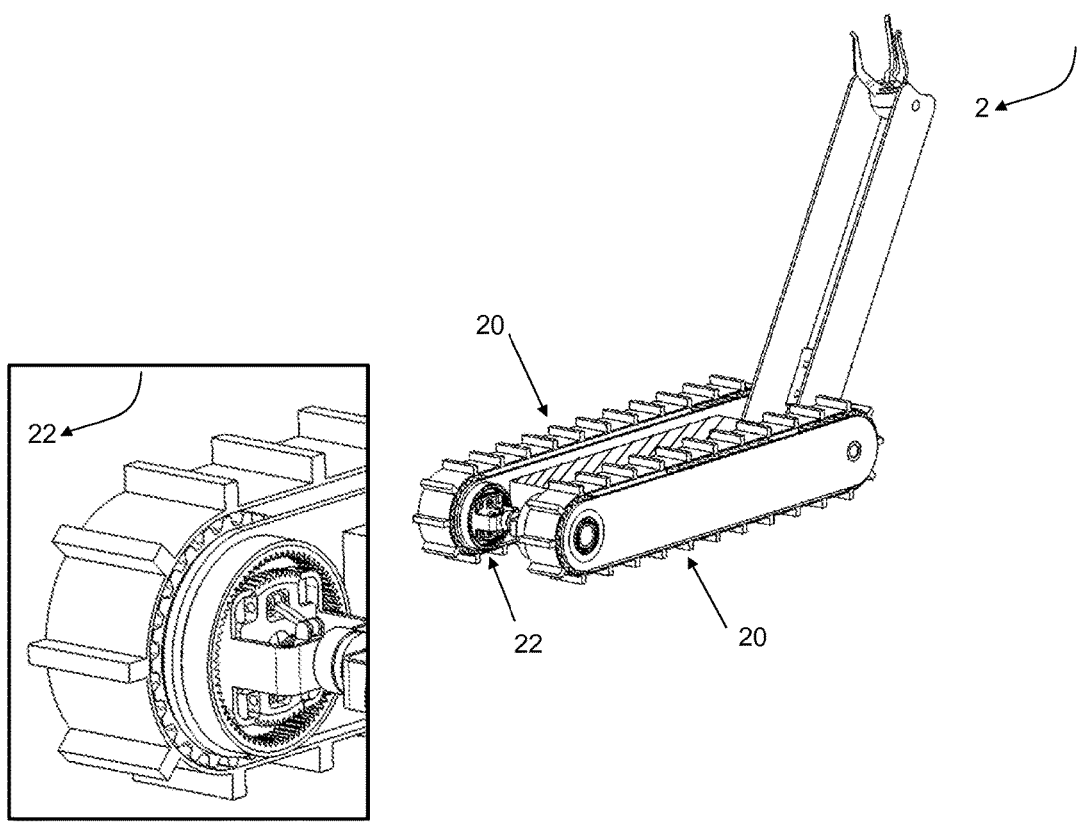
FIG. 8 is a perspective view of the manipulation module of STORM in accordance with another preferred embodiment of the invention having two tracked units and two C-Mech assemblies, and showing an enlarged view of the geared mechanism.
Figure 9:
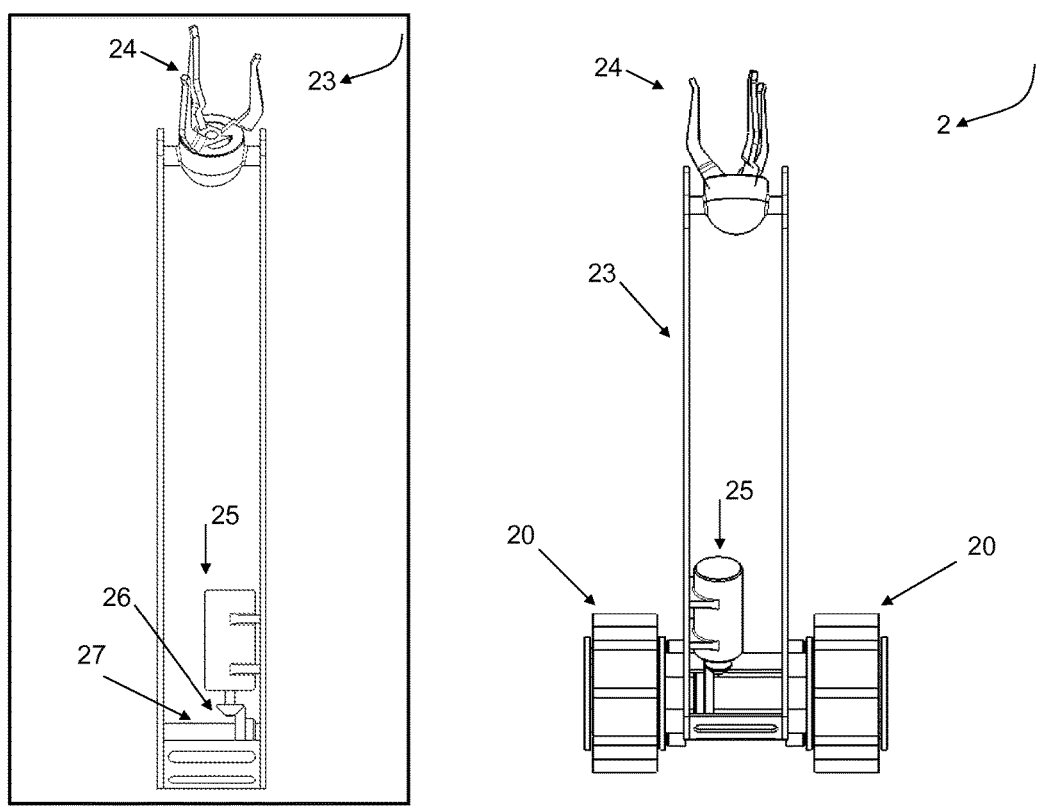
FIG. 9 is a front view of the manipulation module with two tracked units and each carrying one C-Mech and a link carrying an end-effector, and an isolated view of the arm with detail of the motorized mechanism that enables the rotation of the link with the bevel gear assembly.
Figure 10:
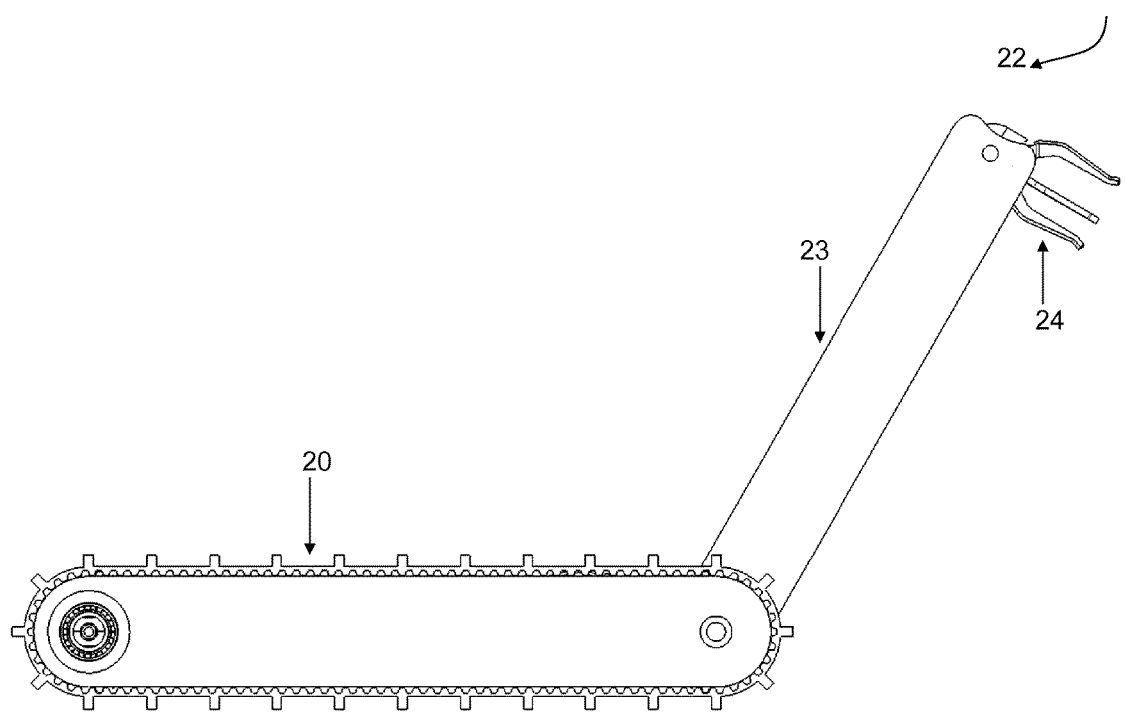
FIG. 10 is a side view of the manipulation module of FIG. 8 with the arm extended.

Turning to FIGS. 8-10, a manipulation module 2 of STORM is shown. It may be used to grip and manipulate objects, carrying objects and interacting with the surroundings. The end-effector 24 is shown having two or more fingers, and is carried by the arm 23 at the upper extremity. However, it will be apparent that any suitable manipulation module 2 and/or end-effector can be provided.

The revolution of arm 23 is generated by the motor assembly 25 via a gearbox and bevel gear assembly 26. The larger gear of the bevel assembly 26 is rigidly connected to the shaft 27 and behaves as a sun gear, while the smaller gear is rigidly connected to the output shaft of the motor assembly 25 and behaves as a planet gear. Thus, any rotation of the planet gear generates a planetary rotation of the motor assembly 25 around the fixed sun gear, which eventually enables limited rotation of the arm 23 around the shaft 27 since the motor assembly 25 is rigidly connected to the arm 23, and thus carries the latter (arm 23). The motor assembly 25 is powered by batteries 29.

Figure 12:
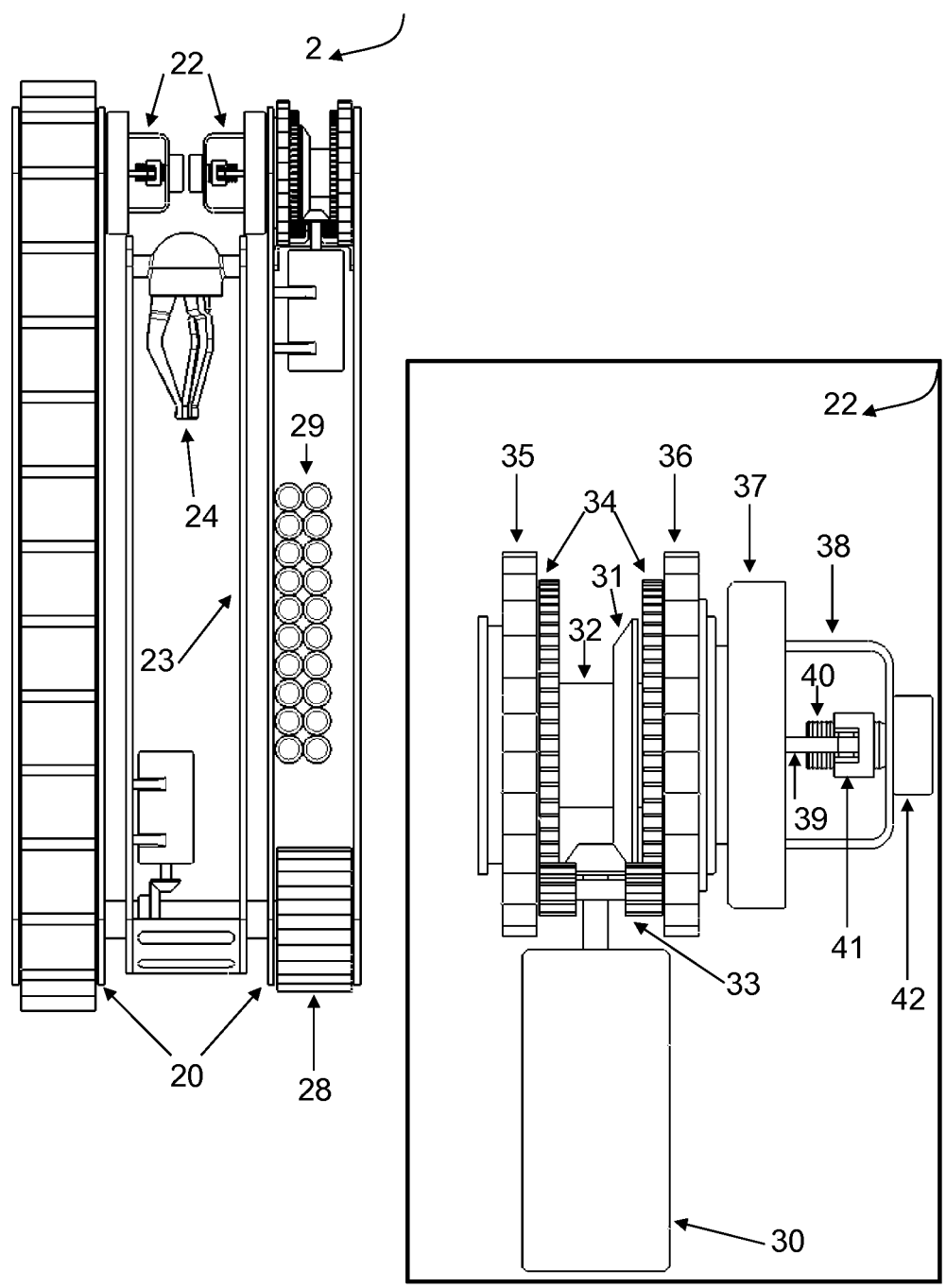
FIG. 12 is a top view of the manipulation module of FIG. 8 with the arm extended and with one of the timing belts hidden to expose the batteries and C-Mech assembly, with a close-up view of the C-Mech assembly having a bevel transmission, spindle drive, active pulleys, coupling and linkage mechanism.

Each tracked unit 20 contains a timing belt driven by an electrical motor 30 through a geared mechanism 22 that actuates active pulleys 35 and 36 (FIG. 12). The motor 30 is powered by the batteries 29 housed under the timing belt. The belt on the other hand is supported at one end by active pulleys 35 and 36, and by a passive pulley 28 at the other end (FIG. 12). Unlike the locomotion module 1 of FIGS. 1-7, the manipulation module 2 is not configured to provide omni-directional mobility. In fact, the manipulation module 2 need not be provided with omni-mobility, and for this reason is steered using traditional differential drive of the tracks via the timing belts.

Docking Interface

The locomotion module 1 and the manipulation module 2 are self-contained entities of STORM, with each possessing its own individual mobility mechanism and power source. This independence of one module from the other allows individual modules to sneak through small voids in a structure prior to docking with each other, and later assemble in an architecture to execute a task that requires scaled capabilities. It also allows the sharing of some tasks amongst individual modules, such as exploratory missions, terrain mapping and rudimentary manipulation via the manipulation module (FIG. 10). To accomplish these exploratory tasks, STORM modules can be equipped with a sensor suite for navigation, localization and visual perception (LIDAR, Sonars, GPS and Cameras among others) along with embedded computer boards and wireless communication hardware. In conjunction with the ability of operating as individual modules in a swarm, STORM modules can operate as a group in a unified morphology. This reconfigurable and scalable aspect of STORM, dictated by the task or the changes in the terrain dynamics, is enabled by docking interfaces carried jointly by both modules.

Figure 19:
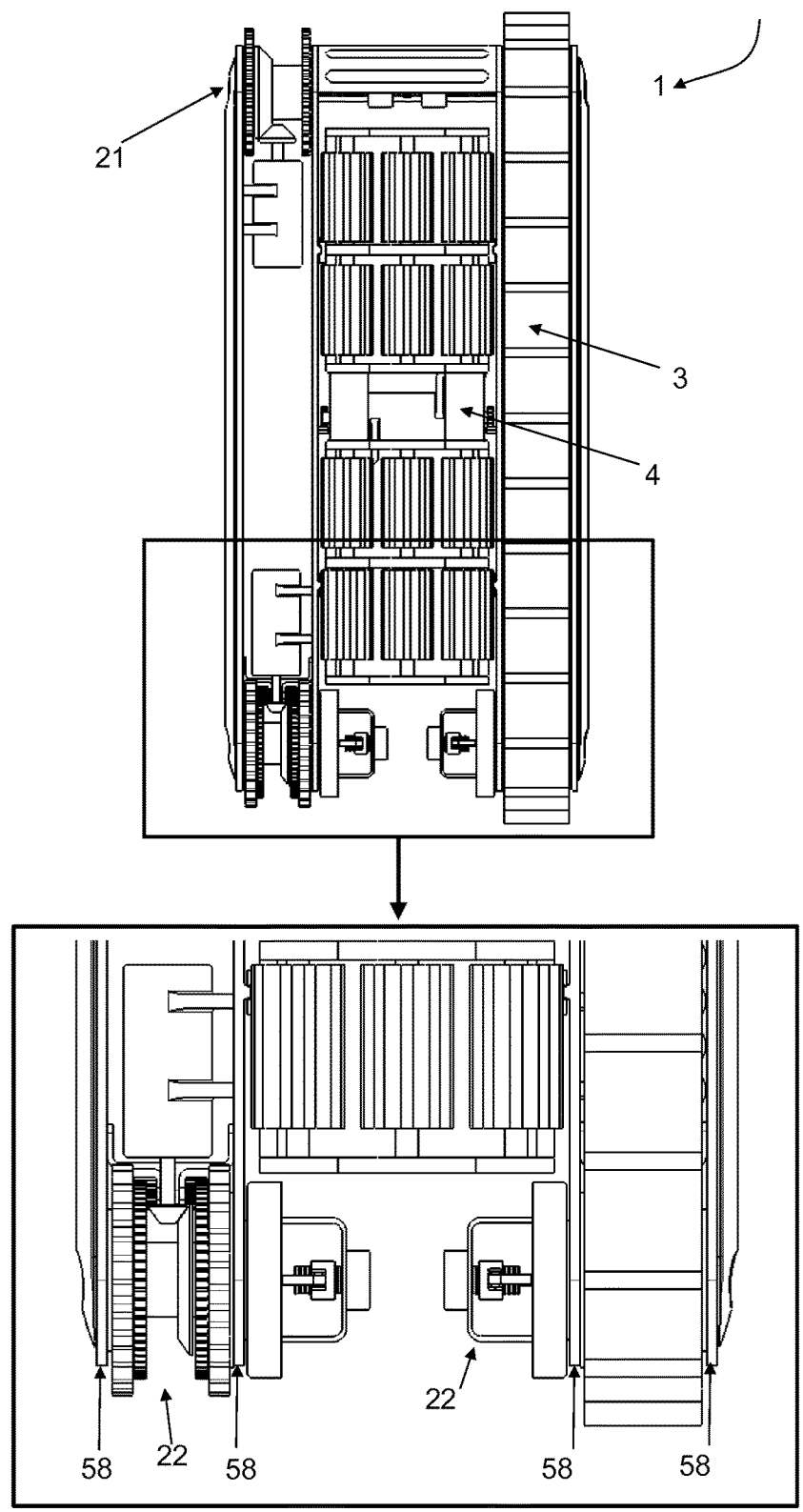
FIG. 19 is a top view of another embodiment of the locomotion module where the module carries one T-Mech assembly at one extremity and two C-Mech assemblies instead of the T-Mech at the other extremity, which allows locomotion modules to dock amongst themselves.
Figure 20A:
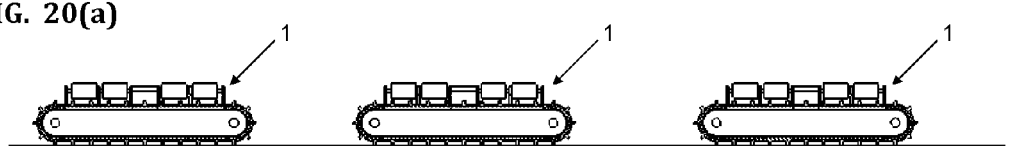
FIGS. 20(a)-(e) are views illustrating a sequence of maneuvers that three locomotion modules execute to achieve alignment and subsequently dock.
Figure 20B:
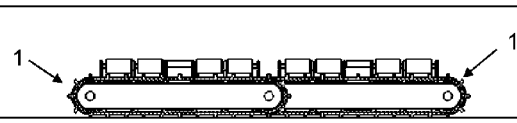
Figure 20C:
Figure 20D:
Figure 20E:
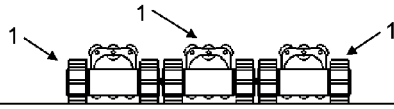

Accordingly, the STORM docking interface enables docking between the locomotion module 1 and the manipulation module 2, or between locomotion modules amongst themselves (if slight changes to the original design of locomotion module 1 are implemented as shown in FIG. 19). Referring to FIGS. 12 and 19, the STORM docking interface contains two main components: a translational mechanism generally carried by the locomotion module 1 called the T-Mech 21 (the male adapter), and a clamping mechanism carried by the manipulation module 2 and called the C-Mech 22 (the female adapter).

Figure 11:
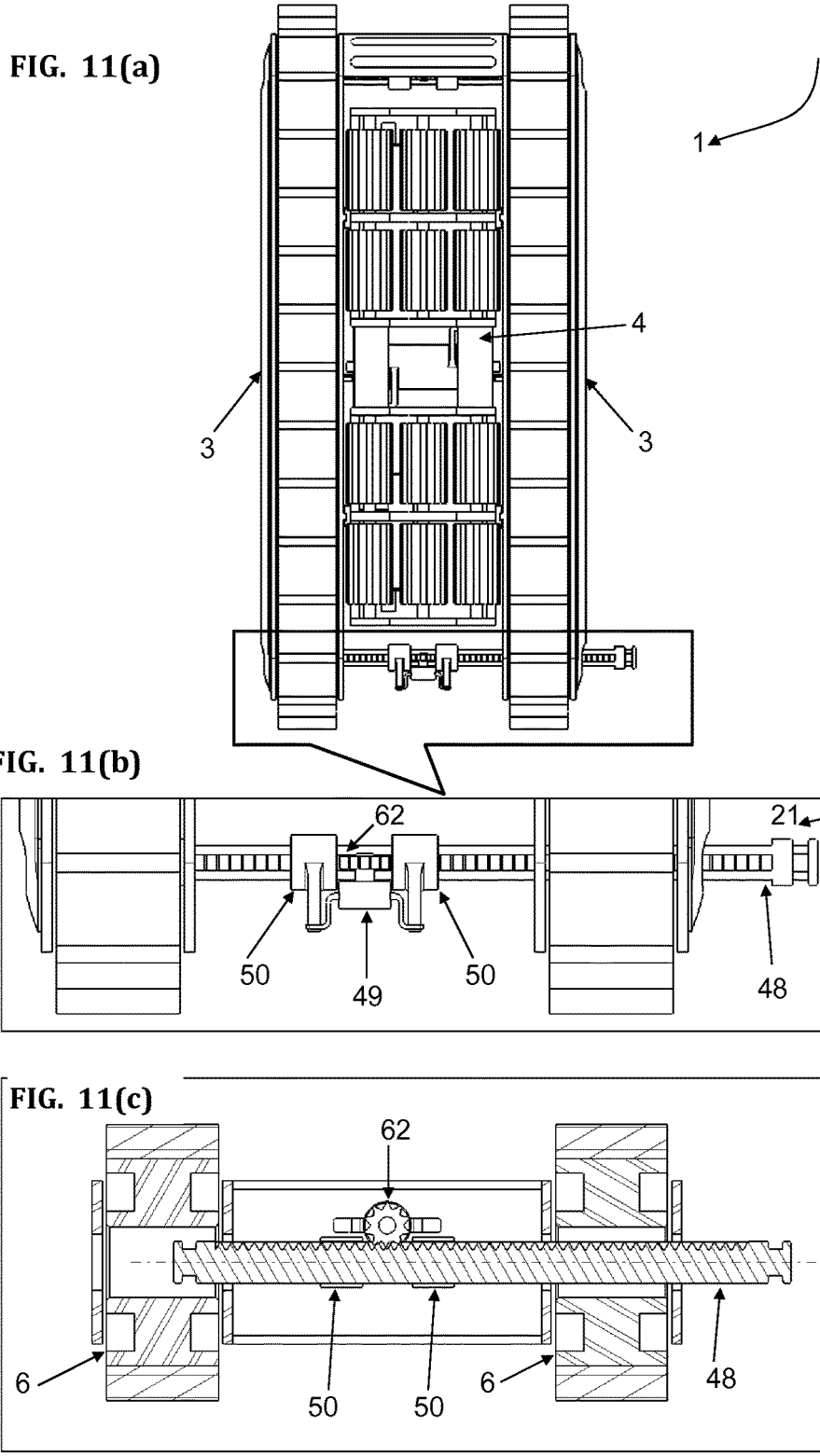
FIG. 11(a) is a top view of the locomotion module of FIG. 1 with the T-Mech assembly having a motor/pinion assembly, linear bearings and an extended shaft, and an enlarged view (FIGS. 11(b), (c)) of the extended shaft.

The T-Mech 21 is a motorized shaft that slides towards the C-Mech 22 when alignment is achieved between the corresponding modules, as best shown in FIG. 11. The C-Mech 2 is a linkage mechanism driven by a lead screw (or a slider-crank mechanism (FIG. 28)) that clamps on the hexagonal cross section of the T-Mech shaft. Because of the lead screw, back drivability of the C-Mech is not possible. This guarantees rigid docking between the two modules, and enables the transmission of the high torque required to rotate one module around the other. The T-Mech/C-Mech assembly disables the lateral translation of one module with respect to the other, and enables the rotation of one module around the other about a common pivot point.

The T-Mech Assembly 21 (the Male Adapter)

One of the embodiments of locomotion module 1 is a configuration where the module contains two T-Mech's 21 (FIG. 19), one at each end of the locomotion module 1. Another embodiment is where the locomotion module contains one T-Mech 21 at one end, and two C-Mech's 22 at the other end as shown in FIG. 19. This embodiment enables locomotion modules to dock amongst themselves such as in the sample configuration shown in FIG. 21. Each T-Mech 21 can dock with a manipulation module 2 or a locomotion module 1. Turning to FIG. 11, the T-Mech 21 contains a shaft 48 that extends the width of locomotion module 1.

Figure 18:
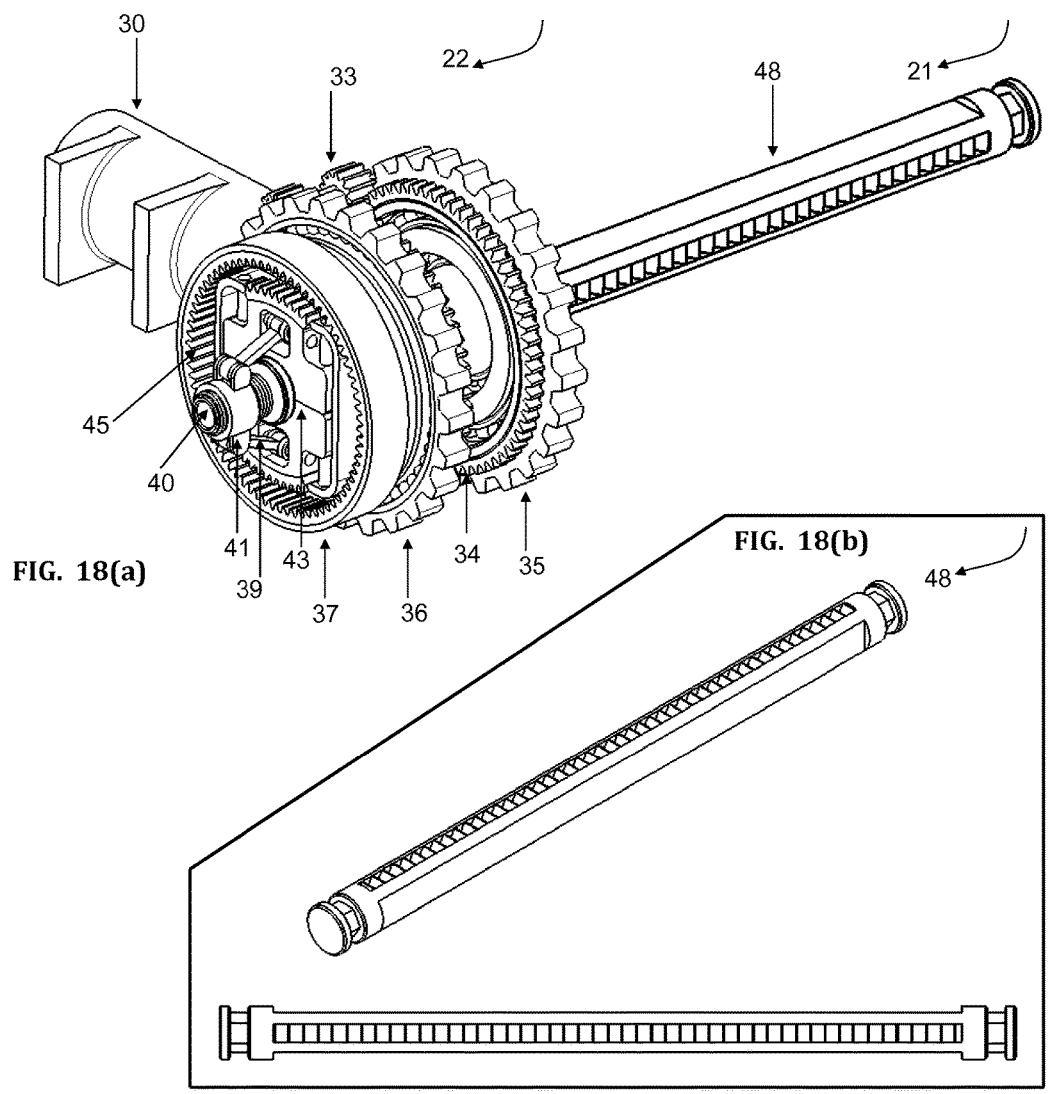
FIG. 18(a) is a perspective view of the C-Mech assembly in the clamp mode with the T-Mech shaft inside the hollow hub of the C-Mech shaft, and the clamping hubs gripping on the hexagonal section of the T-Mech shaft.
FIG. 18(b) shows the shaft in further detail.

As best shown in FIG. 18, the shaft 48 has a central rack and a head with a narrowed-down hexagonal neck at each extremity. The rack is located on one side of the shaft 48, either on the top side or the bottom side. The head at each extremity of the shaft 48 is wider than the hexagonal neck where the diameter of the head (and the shaft) is greater than the diameter of the circle where the hexagon is inscribed. This is designed to prevent the shaft 48 from sliding out of the grip of the clamps 43 during the clamp mode, thus preventing two docked modules from moving away from one another along the lateral direction. Although a hexagonal cross-section was selected for the neck, other geometries are also possible such as a cube or an octagon. The preference however is for a polygonal shape that presents a few number of sides so that the neck cross-section does not become analogous to a discrete circular circumference which minimizes the grip of the clamps and enables shaft 48 to slip inside clamps 43 during rotation.

Referring to FIG. 11, the shaft 48 is supported by two linear bearings 50 positioned at the center of the shaft 48, and connected to the semi-cylindrical frame that connects the parallel tracked units 3. A pinion 62 and motor assembly 49 is mounted to the semi-circular cover of the locomotion module 1, and drives the shaft 48 as best shown in FIGS. 11(*b*), (*c*). The assembly 49 rotates to generate a translation of the shaft 48 which is guided by the linear bearings 50. The pinion couples with the rack of the shaft 48 to move the shaft 48 in a transverse direction (to the left and right of the locomotion module in the embodiment of FIG. 11). The translation of the shaft 48 extends/retracts the shaft 48 outward/inward from either side of the locomotion module 1 depending upon the direction of rotation of motor assembly 49. As shown in FIG. 11, the shaft 48 is extended outward from the rear right side (the bottom right in the figure) of the locomotion module 1.

The shaft 48 runs through the hollow central hub of the passive pulleys 6 supporting the timing belts of each of the tracked units 3 (cross-section shown in FIG. 11(*c*)). As shown in FIG. 1, the shaft 48 (which operates as an axle) is shown in the front through the active pulleys 5 and in the back through the passive pulleys 6 of the locomotion module 1. In general, the locomotion module 1 can carry up to two T-Mech's 21, one at the front and the other at the back of the frame (FIG. 2). These two T-Mech's 21, combined with the ability of extending the shaft 48 from either side of the chassis, allow the locomotion module I to dock from any one of its four corners.

The shaft 48 of the T-Mech assembly 21 is housed completely inside the locomotion module 1, as shown in FIG. 5. When docking is initiated, the locomotion module can extend the shaft 48 of one T-Mech assembly 21 from only one of the two sides of the module, either from the left or from the right (though not from both at the same time). Referring to FIG. 11(*c*), the shaft 48 is initially inside the module spanning its width, which means that the shaft 48 is already going through the hub of both pulley sets (either the two passive pulleys 6 or the two active pulleys 5, depending upon the location of the T-Mech). When the shaft 48 is extended from one side of the module, it clears the hub of the furthest pulley. However, the width of the module and the control scheme of motor assembly 49 is configured such that the shaft 48 can never leave the support provided by the two linear bearings 50. Thus, the shaft 48 always reaches the clamps of the C-Mech of the mating module without losing support from the two linear bearings 50 which are located in the center of the module shown in FIG. 11. Furthermore, the pulleys, passive or active, never interact with shaft 48 as the hollow hub they provide is larger in diameter than the diameter of shaft 48.

The C-Mech Assembly 22 (the Female Adapter)

Turning to FIGS. 12-18, the C-Mech 22 possesses a unique functionality in which it provides actuation to the timing belt of the tracked unit 20, while concurrently providing locking means to the shaft 48 of the T-Mech assembly 21 during docking maneuvers, thus creating a rigid pivot point that enables the manipulation module 2 to revolve around the locomotion module 1, and vice-versa. These two capabilities are enabled by a single motor assembly 30 (Motor, Gearbox, Brakes) via a motorized selection mechanism that switches between three modes of operation: drive (FIG. 16), clamp (FIG. 17), and neutral (FIG. 18).

The motor assembly 30 is located under the timing belt of the tracked unit 20 and connected to its side plates 58 (see FIGS. 5 and 19), and has its output torque coupled directly to a bevel gear assembly 31. The larger gear of the assembly 31 is rigidly connected to the hollow shaft 32 which is supported by bearings 53 and 54. The bearing 53 is housed inside the hub of the active pulley 36. The bearing 54 is accommodated inside the hub 56 which is rigidly connected to the inside frame plate 58 of the tracked unit 20. The shaft 32 further extends outside the inner frame of the tracked unit 20 and into the hollow inner section of the coupling 37. Similarly, the active pulley 36 possesses a cylindrical hub extrusion that extends outside the frame of tracked unit 30 towards the inside section of the manipulation module 2 where the arm 23 is housed. This extrusion carries the coupling 37 and the two are rigidly connected together. The coupling 37 and pulley 36 assembly is supported on two bearings: bearing 47 resting on hub 52 which is rigidly connected to the outside plate 58 of the tracked unit 20, and the bearing 51—housed inside the hub 52—which supports the extruded hub of the pulley 36.

The coupling 37 carries—inside its hollow section—internal gear 45, and the two are rigidly connected together. An additional frame 38, housed inside the coupling 37, is rigidly connected to the shaft 32. A clearing gap between the back face of the frame 38 and the inner front face of the coupling 37 allow the frame 38 along with all parts connected to it, to rotate inside the coupling 37 independently from the latter in the neutral mode when the motor 30 is actuated. In this mode, the rotation of the motor 30 causes the rotation of the shaft 32 which rotates the frame 38 since the latter is rigidly connected to this shaft. However, in the neutral mode, the pulleys, and specifically the pulley 36, does not rotate which means that the coupler 37 does not rotate either since the later is rigidly connected to pulley 36.

Figure 14:
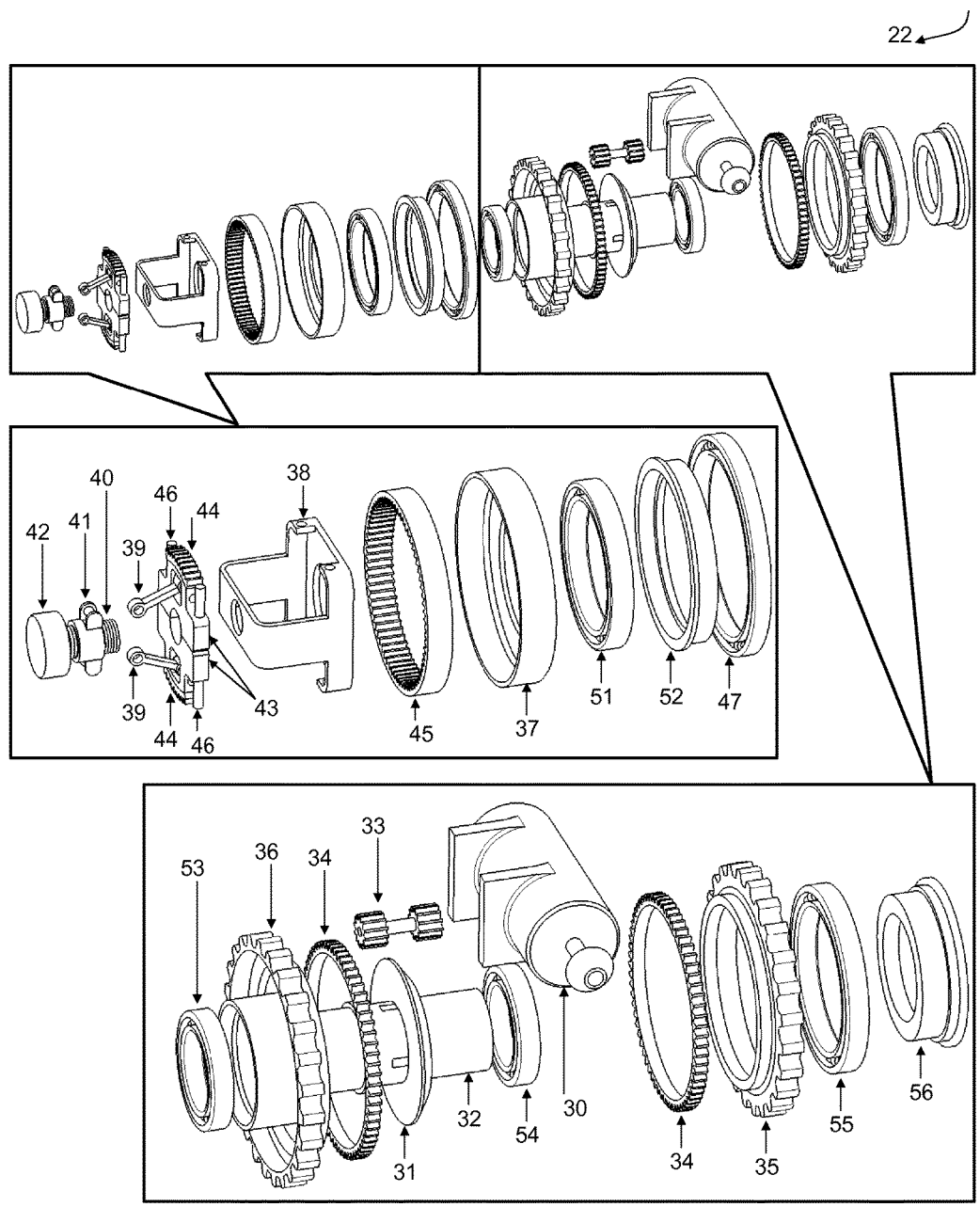
FIG. 14 is an exploded detailed view of the C-Mech geared mechanism assembly.
Figure 15:
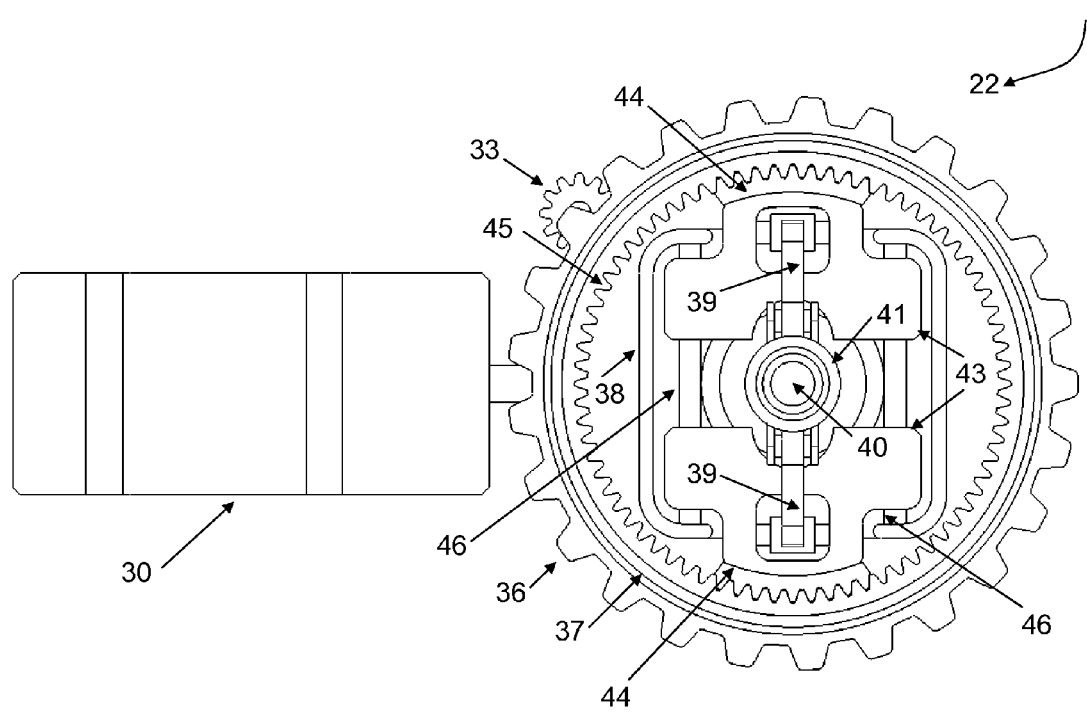
FIG. 15 is a side view of the C-Mech in the default drive mode where the gear combs engage the internal gear to transmit the motor torque to the active pulleys.
Figure 16:
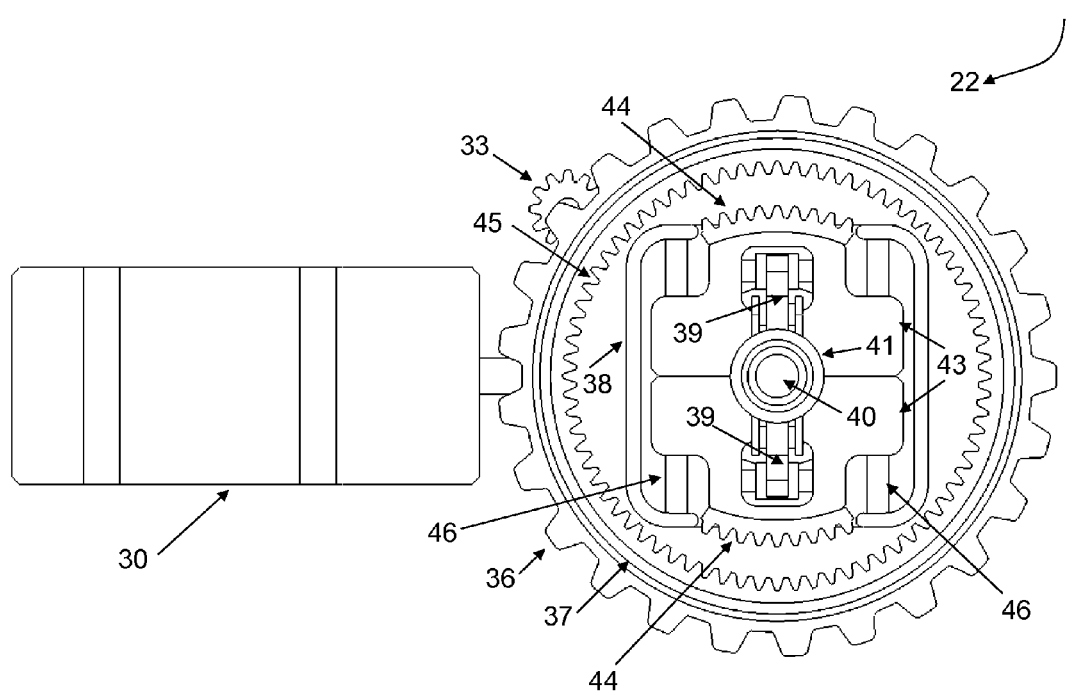
FIG. 16 is a side view of the C-Mech in the clamp mode where the gear combs disengage the internal gear to clamp on to the T-Mech shaft during docking.

The frame 38 carries two rails 46 which are rigidly connected to the frame 38. Two symmetric clamps 43 slide on the rails 46, guided by linear bearings or sleeve bearings. Each clamp 43 possesses a rectangular pocket in which a shaft carrying arm 39 is housed. The arm 39 rotates freely around this shaft. The top surface of the clamp 43 carries an external gear comb 44 which has the same pitch diameter as the internal gear 45 in order to enable 44 and 45 to mesh together during the drive mode (FIG. 15). The inner surface of the clamp 43 is hollowed with a hexagonal cross-section that matches the cross-section of the neck of the shaft 48 that constitutes the T-Mech assembly 21. One embodiment of the frame 38 is shown in FIG. 14, where the frame 38 attaches rigidly (through screws) to the extremity of the shaft 32 which extends outwards towards the C-Mech. The frame 38 has a near rectangular shape with four top and bottom through holes that accommodate the rails 46. An extruded cross-member further allows the connection of the motor assembly 42 to the frame 38.

Figure 13:
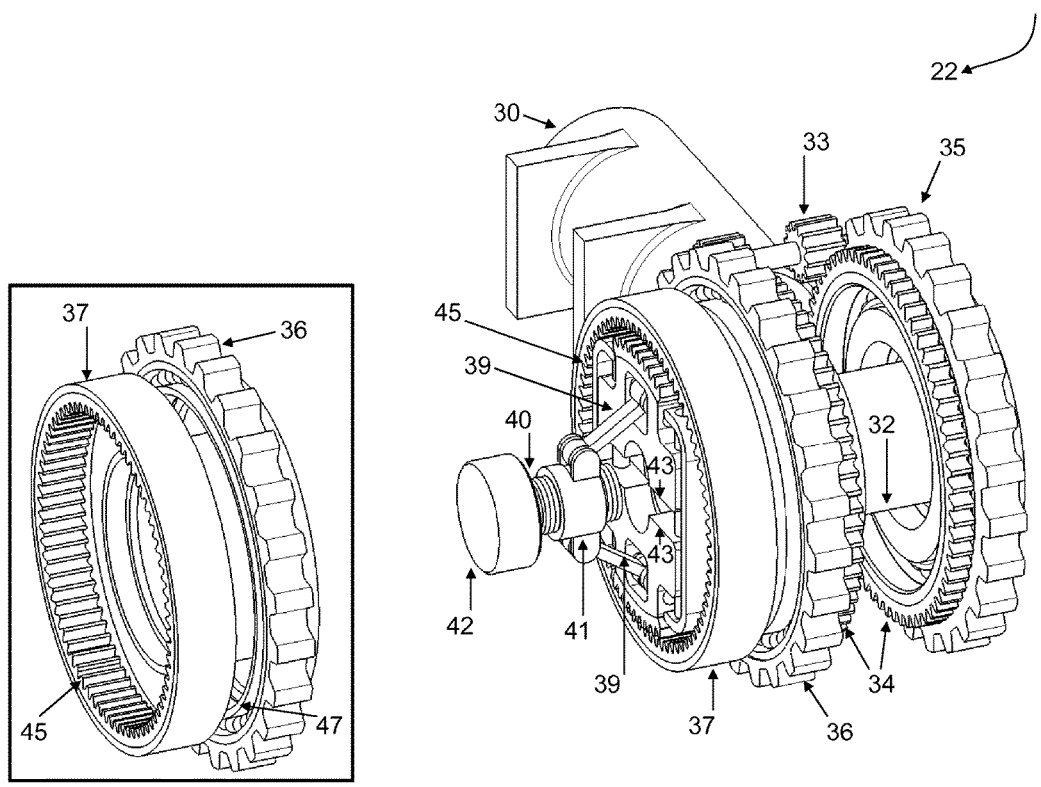
FIG. 13 is a detailed perspective view of the C-Mech assembly along with a close-up view of the active pulley and internal gear located inside the coupling.

As best shown in FIG. 12, a lead screw 40 is provided which extends through an opening in the cross-member of the frame 38. A motor 42 is attached to one end of the lead screw 40 and rests against the outside surface of the cross-member of the frame 38. A nut 41 is coupled to the lead screw 40 and is positioned at the inside surface of the frame 38 cross-member. Turning to FIG. 13, the nut 41 has flanges which project out from the surface of the nut 41. One end of the arm 39 is pivotally connected between the flanges of the nut 41. The opposite end of the arm 39 is pivotally connected to the frame 38. Accordingly, the arm 39 freely rotates with respect to the frame 38 and the screw 40 and nut 41.

Thus, the frame 43, arm 39 and nut 41 create a linkage mechanism driven by the lead screw 40. This mechanism converts the rotation of the lead screw 40 into a translation of the clamps 43 along the rails 46. The nut 41 is constrained to only translate along the lead screw axis as its rotation is restricted by the frame 43 (through arms 39) which can only translate along the rails 46. The lead screw 40 is actuated by the motor assembly 42 (motor, gearbox, sensor) and the two are adequately supported and carried by the frame 38.

Figure 28:
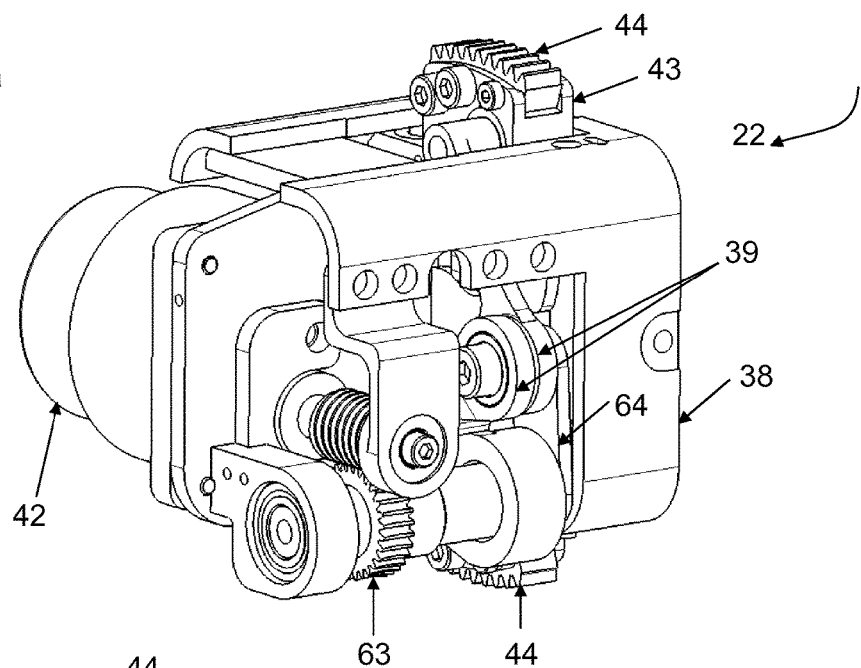
FIGS. 28(a)-(b) show another embodiment of the C-Mech, where the translation of the top and bottom clamps is enabled by a rotary arm whose kinematics is identical to a slider-crank mechanism, where both top and bottom clamps are driven by the same crank whose non-back-drivability is ensured by a worm and worm gear assembly where the worm connects to the motor output shaft and the worm gear connects to the crank.
Figure 28:
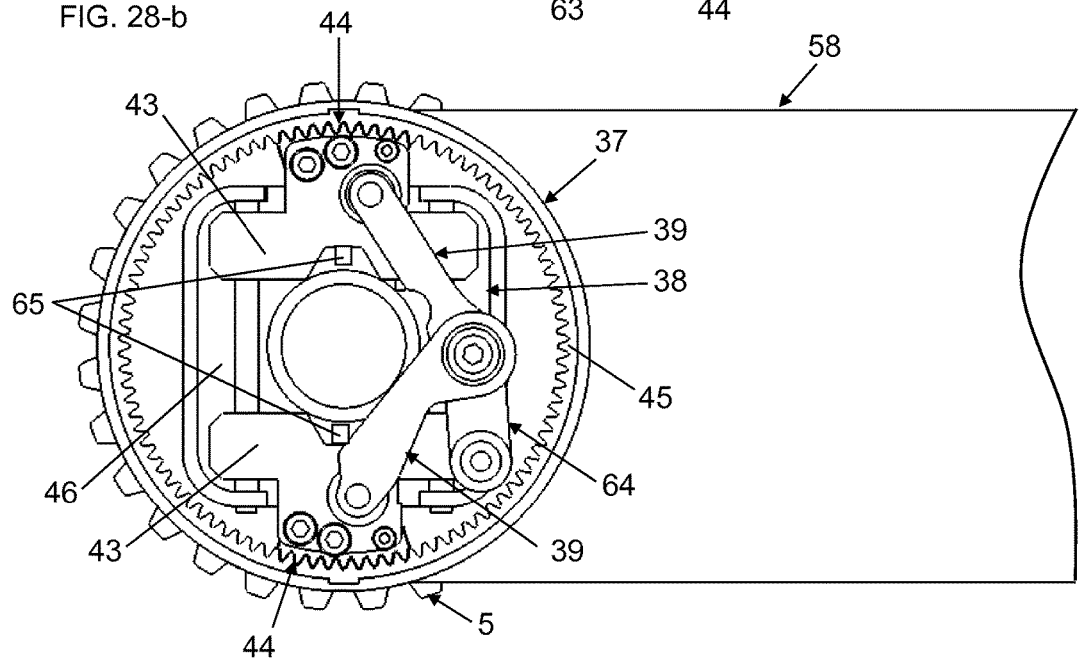

Another embodiment of the C-Mech 22 is illustrated in FIG. 28. This embodiment can be used with the T-Mech 21 of FIGS. 11, 18, 19. Here, the lead screw and nut mechanism (of FIGS. 12-17) is replaced by a slider crank mechanism. In this case, the non-back-drivability of the clamps is guaranteed by the worm and worm gear assembly 63 (instead of a lead screw) where the worm is connected directly to the output shaft of the motor and gearbox assembly 42, and where the worm gear is connected to the arm 64. Furthermore, the arm 64, or the crank, is connected to the top and bottom clamps 43 (or the sliders) through two links 39 (FIG. 28(*b*)) which play an identical role as in the case of the lead-screw-driven C-Mech embodiment, i.e. they convert the motion of the arm 64 to a translation of the clamps 43 guided by the two rails 46. Each link 39 shares one revolute joint with the arm 64 at one extremity, and another revolute joint with the corresponding clamp 43 at the other extremity.

The advantage of the slider crank mechanism (FIG. 28) over the lead screw mechanism (FIGS. 12-17) is that the former is more compact and thus occupies less space in the assembly. The disadvantage however is in the added complexity of the kinematics of the slider crank where the relationship between the rotation of the arm 64 and the translation of the clamps 43 is highly non-linear. Furthermore, with one crank 64 driving two sliders 43, the displacement of the top slider (or clamp) does not equal the displacement of the bottom clamp for the same angular rotation of the crank 64. However, such displacement offset can be minimized by selecting appropriate lengths of the links 39. The lead screw mechanism on the other hand does not exhibit such limitation where the top and bottom clamps always translate by the same distance and at the same speed for the same displacement of the nut 41.

Docking Modes of Operation

Figure 17:
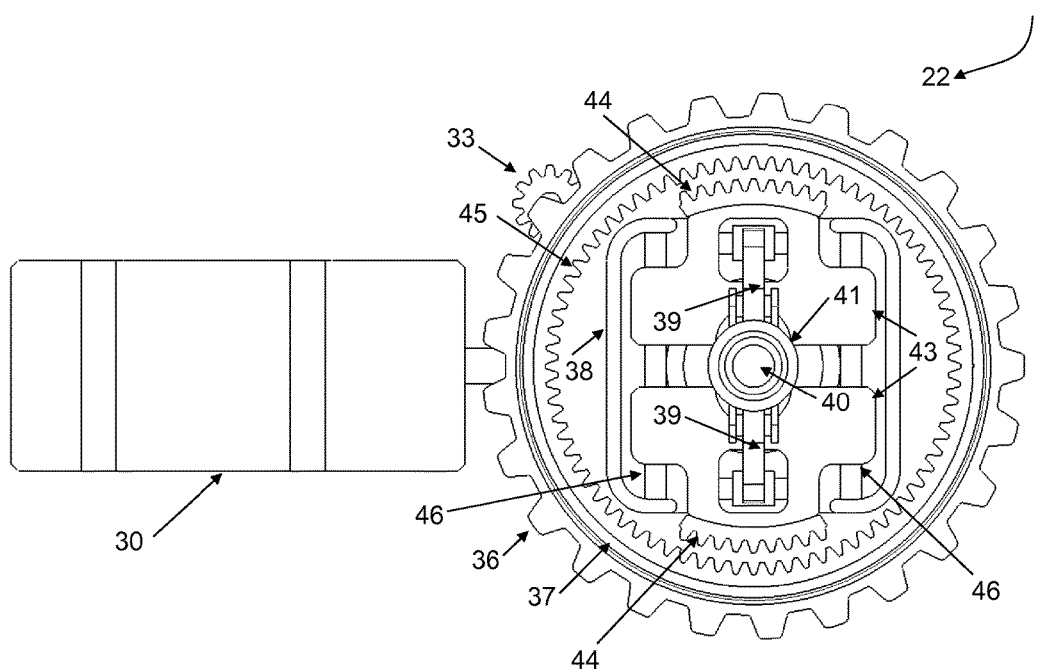
FIG. 17 is a side view of the C-Mech in the neutral mode where the gear combs disengage the internal gear and the clamping hubs release the grip on the T-Mech shaft.

The docking interface, or the T-Mech/C-Mech assembly 21, 22, operates in three modes: drive mode (default mode) (FIG. 15), clamp mode (FIG. 16) and neutral mode (FIG. 17). In the drive mode (FIG. 15), the power of the motor 30 is transmitted to the timing belt (i.e., the tracks) of the tracked unit 20 via the active pulleys 35 and 36. To achieve this, the external gear combs 44 carried by the clamps 43 engage the internal gear 45. This engagement is actuated by the motor 42 which rotates lead screw 40 in a direction that translates the nut 41 forwards (inwards towards the clamp 43). The nut 41 translation pushes the arms 39 inward which is conveyed to the clamps 43, resulting in an outwards translation of the clamps 43 along the guides 46. Since the clamps 43 are carried by the frame 38 which is rigidly connected to the shaft 32, and since the shaft 32 is rigidly connected to the larger gear of the bevel assembly 31, a rotation of the motor assembly 30 generates a rotation of the shaft 32 which results in the rotation of the frame 38 along with all parts connected to it, including the clamps 43 and the combs 44.

Thus, because the combs 44 are engaged with the internal gear 45, the motor rotation is transmitted to the gear 45, and subsequently to the coupling 37 and directly to the active pulley 36 as the latter is rigidly connected to the coupling 37. However, since only the pulley 36 is connected to the coupling 37, the pulley 35 does not receive any of the torque generated by the motor assembly 30. In fact, the pulley 36 cannot be directly connected to the pulley 35 because any central shaft that extends from one pulley to the other will interfere with the larger gear of the bevel assembly 31. This means that the timing belt of tracked unit 20 is solely driven by the pulley 36 from one extremity only. This creates an asymmetric torque distribution along the timing belt which may cause the belt to twist.

To address this, two gears 34 are added to the assembly, one rigidly connected to the pulley 35, and the other connected to the pulley 36. An off-centric spindle 33 (to avoid clashing with the motor shaft) meshes with the gears 34 and thus transmits the exact torque that the pulley 36 is receiving, to the pulley 35. The continuous torque transmission from the motor assembly 30 to the active pulleys 35 and 36 is guaranteed by the inherent non back-drivability of the lead screw 40 once the motor 42 is turned off. This non back-drivability maintains the engagement of the combs 44 with the gear 45 unless the motor 42 is desirably actuated. The lead screw 40 used in this embodiment is a mechanical component that is inherently non-back-drivable. The rotation of the lead screw generates a translation of the nut 41. Conversely, a translation of nut 41 does not generate a rotation of the lead screw, thus the characteristic of non-back-drivability.

In the clamp mode (FIG. 16, 18), the power of the motor assembly 30 causes the rotation of the locomotion module 1 with respect to another locomotion module 1, or vice-versa. To accomplish this, the external gear combs 44 have to disengage the internal gear 45. This disengagement is actuated by the motor assembly 42 which rotates the lead screw 40 in an inward direction that translates the nut 41 backwards (inward towards the motor assembly 30). Via the linkage mechanism, the nut 41 backward translation is converted to an inward translation of the clamps 43 along the guides 46.

During a docking maneuver the locomotion module 1 is aligned with the manipulation module 2. The shaft 48 of the T-Mech 21 (male member) of the locomotion module 1 is then extended outward in preparation for the docking (as in FIG. 11). The shaft 48 of the locomotion module 1 is received by the C-Mech 22 (female member) of the manipulation module 2. Accordingly, as shown in FIG. 18, the shaft 48 of the locomotion module 1 enters into the hollow shaft 32 until the hexagonal neck of the shaft 48 is aligned with the matched hexagonal central hollow section of the clamps 43.

Once the shaft 48 of the locomotion module 1 is fully received in the hollow shaft 32 of the manipulation module 2, the clamps 43 are then driven inward by the motor assembly 42 via the linkage mechanism, until a desired clamping contact is achieved between the clamps 43 and the shaft 48. That is, operation of the motor 42 pulls the nut 41 outward away from the clamp 43, which in turn pulls the arms 39 outward (with respect to the clamps 43) and moves the clamps 43 inward (with respect to the gear 45). This clamping contact is maintained by the non back-drivability of the lead screw 40 once the motor 42 is turned off. The design of the hexagonal section of the shaft 48, bounded by two shoulders, and the matched hexagonal sections of the clamps 43, prevents the locomotion module 1 from translating away from the manipulation module 2 after docking, once the desired clamping contact is set. This is because the hexagonal neck of the shaft 48 is cascaded between the mating hexagonal hollow created by the two clamps 43 in the clamp mode, which leaves the wider head of the shaft outside of clamp 43, from both sides. This means that the shaft 48, and subsequently the docked module carrying the T-Mech, cannot pull free or alternatively move closer towards the module carrying the C-Mech because of these two shoulders (or heads shown more clearly in FIG. 18-b). Thus, the locomotion module 1 is removably attached to the manipulation module 2.

At the same time, the clamping of the hexagonal sections prevent the clamps 43 from rotating around the shaft 48, which is held fixed by the linear bearings 50. Thus, the clamps 43 are equally held fixed along with all the parts that connect to them, including the frame 38, the shaft 32 and most importantly the larger gear of the bevel assembly 31. This enables the larger bevel gear to behave as a sun gear for the smaller bevel of the assembly 31, whereby the larger bevel gear is stationary and that the smaller gear revolves around it.

In another embodiment, in addition to the mechanical non-back-drivability of the docking interface provided by the C-Mech's worm and worm gear assembly 63, the addition of protruded pins 65 to the clamps 43 may reinforce the clamp mode. The pins 65 may fit into holes in the circumference of the docking shaft 48 hexagonal neck. This reinforcement may help to amplify the yield torque by adding rigidity to the active joint created through the docking of modules.

After clamping, any rotation of the motor assembly 30 will generate a planetary rotation of the manipulation module 2 around the sun gear (and subsequently the shaft 48), when the locomotion module 1 is on the ground. This same actuation converts to a rotation of the locomotion module 1 around the manipulation module 2 when the latter is on the ground. The clamping procedure can be reversed, whereby the clamps 43 unlock the shaft 48 by translating outwards, driven by the motor assembly 42, to allow the locomotion module 1 to separate away from the manipulation module 2 (using sideways omni-directional mobility) during undocking maneuvers. The shaft 48 can then be withdrawn from the manipulation module 2 and retracted within the locomotion module 1.

In the neutral mode (FIG. 17), the clamps 43 are positioned along the guides 46 in a middle position between the clamp mode (where the clamps 43 are fully open to engage the internal gear 45) and the drive mode (where the clamps 43 clamp fully closed to clamp against the shaft 48). Accordingly, the clamps 43 in the neutral position do not engage the internal gear 45 (so that the drive mode is not enabled), and also do not clamp to the shaft 48 (so that the clamp mode is not enabled).

In this position, the power of the motor assembly 30 causes the frame 38 to rotate freely inside the coupling 37, along with all the parts connected to it including the clamps 43 and the combs 44. This free rotation is extremely important for the operation of the C-Mech 22, as it allows the radial alignment of the teeth of the combs 44 with the teeth of the gear 45 prior to engagement and the initiation of the drive mode. It also allows the alignment of the faces of the hexagonal section of the clamps 43 with the faces of the hexagonal section of the shaft 48 prior to clamping and the initiation of the clamp mode.

Illustrative Configurations

STORM modules have the ability to generate a variety of configurations in response to external stimuli, such as the nature of the assigned task or the changes in terrain topologies. These configurations are enabled by the docking interfaces and can only be realized once alignment between modules in the configuration is established.

One embodiment of the invention is shown in FIG. 20, where docking between three locomotion modules is illustrated. Prior to docking, the locomotion modules have to align in a spatial frame, with one remaining stationary and the other accomplishing the maneuvers resulting in docking. In the embodiment shown, alignment is executed between locomotion modules.

Knowing the position of a module a priori (such as through localization techniques, such as GPS, odometry or dead-reckoning), the locomotion module 1 first moves along the longitudinal direction towards the other locomotion module 1, FIG. 20(*a*), until the T-Mech 21 and the C-Mech 22 are in the same vertical plane, FIG. 20(*b*). If the ground is flat, the centerlines of the T-Mech 21 and C-Mech 22 may inherently be aligned; otherwise, the wheels unit 4 will accomplish this alignment by translating along the vertical axis, thus moving the tracked units 3 carrying the T-Mech 21 to the same horizontal plane as the C-Mech 22. The final step in the process of alignment is achieved by closing the gap between the modules, FIGS. 20(*c*), (*d*), (*e*). This is executed by moving the locomotion module 1 in the lateral direction using the omni-directional mobility of the wheels unit 4. Only then will the T-Mech 21 shaft 48 of the locomotion module 1 be deployed outwards toward the C-Mech 22 of the other locomotion module in order to achieve the docking between the two modules.

Figure 25:
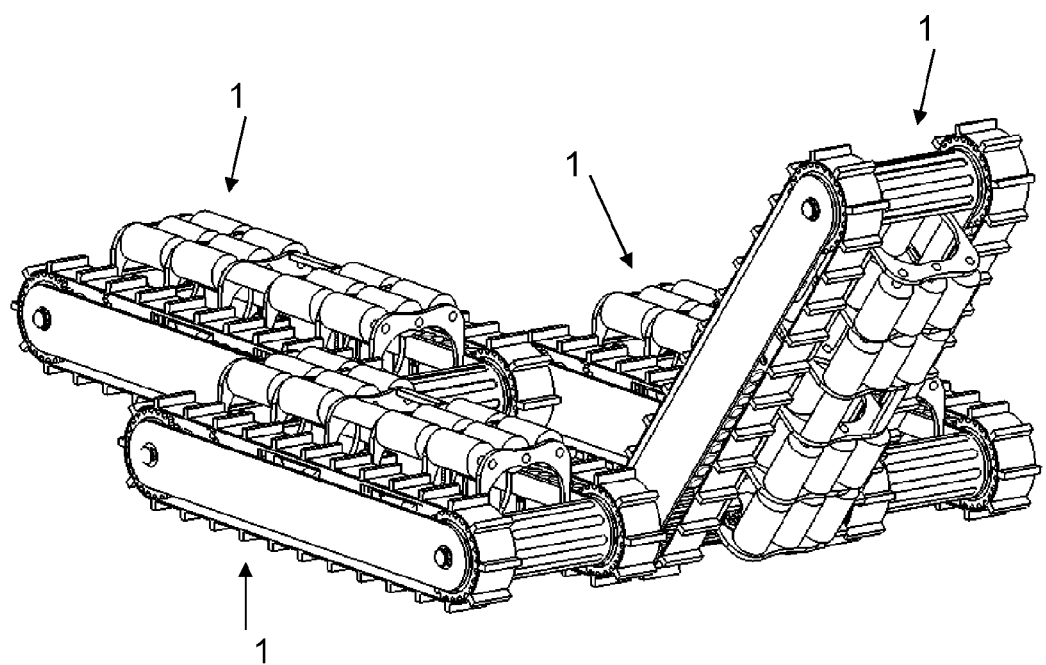
FIG. 25 shows a symmetric and omni-directional configuration using four docked locomotion modules, where two locomotion modules are cascaded in the center of the configuration, one in the front, and the other in the back.

This same process can be repeated to achieve docking between multiple locomotion modules 1 to generate configurations. For instance, as shown in the non-limiting embodiment of FIG. 21, three locomotion modules 1 can be connected together. The two outer modules 1 have T-Mech 21 which engage the C-Mechs 22 located at one end of the middle locomotion module 1. And, as shown in FIG. 25, four locomotion modules 1 can be joined together. FIG. 25 is similar to FIG. 21, with the addition of a locomotion module 1 at the opposite ends of the outer modules 1.

Figure 21:
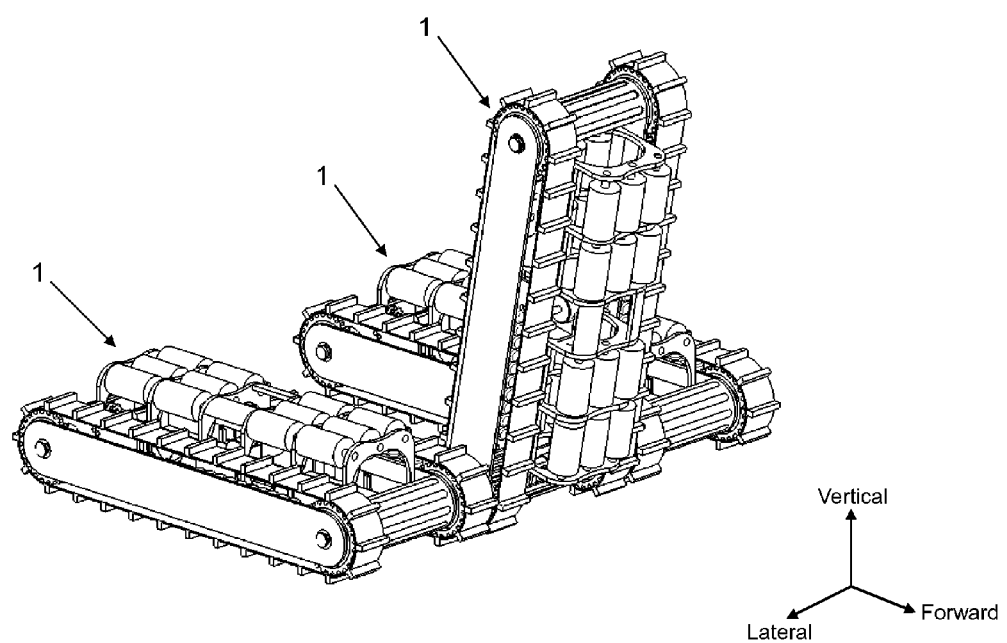
FIG. 21 is a perspective view showing three locomotion modules docked together and rotation of the middle module, in an omni-directional configuration, where one locomotion module is cascaded between two other locomotion modules.

One of the basic morphologies that can be generated by STORM modules is a mobile configuration with three locomotion modules (FIG. 21). This configuration inherits the omni-directional mobility of the locomotion modules 1, in that it can achieve forward/backward and lateral mobility, as well as vertical displacement. In this configuration, the docking interfaces that connect the two outer locomotion modules 1 to the middle locomotion module 1 enable the rotation of the middle module 1 around the common pivot axis created by the shafts 48. This is achieved by diverting the power of the motor 30 away from the timing belts of the tracked units 20. The vertical translation that the wheels unit 4 can achieve further adds a prismatic joint to the docked configuration. This joint enables the translation of the whole robot along the vertical axis which extends the workspace and subsequently the vertical reach of the central module.

Figure 22:
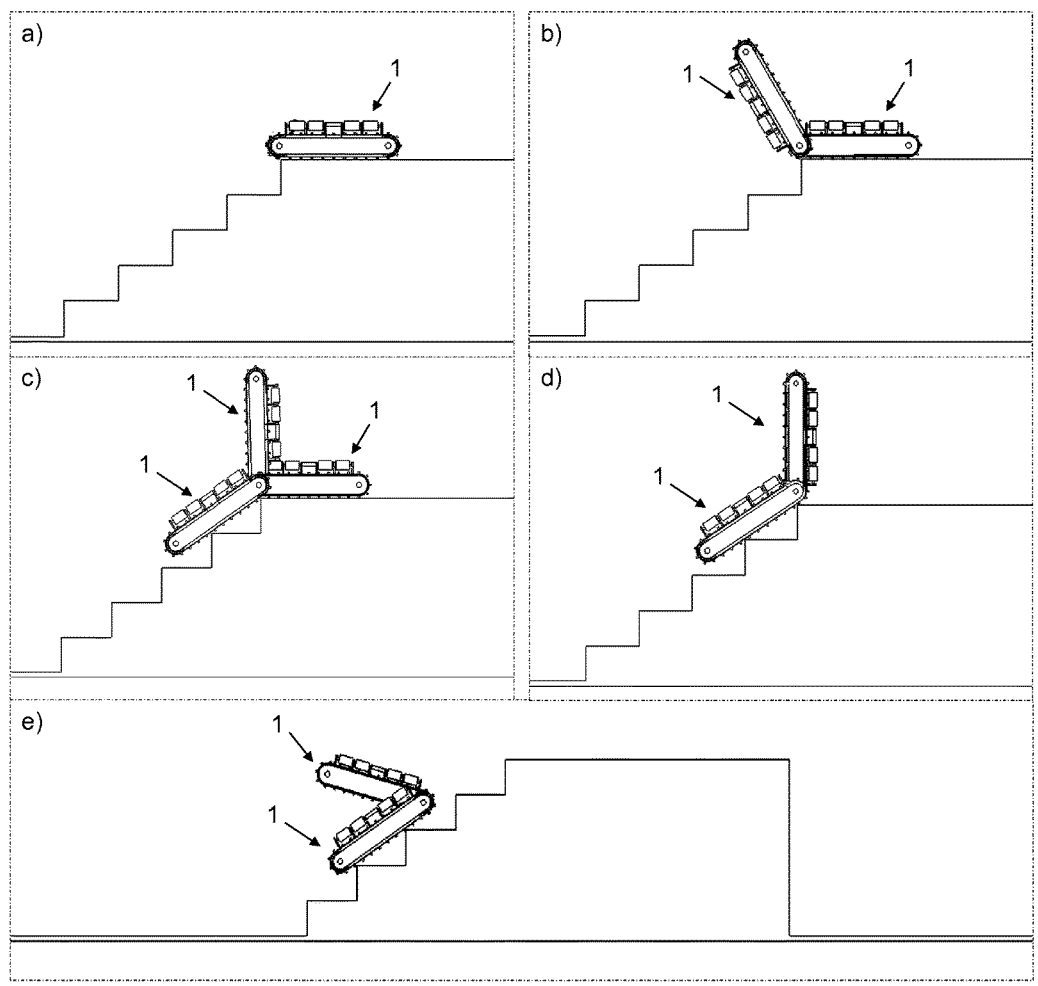
FIG. 22 shows a sequence of maneuvers that a configuration with three docked locomotion modules can execute to descend stairs.
Figure 23:
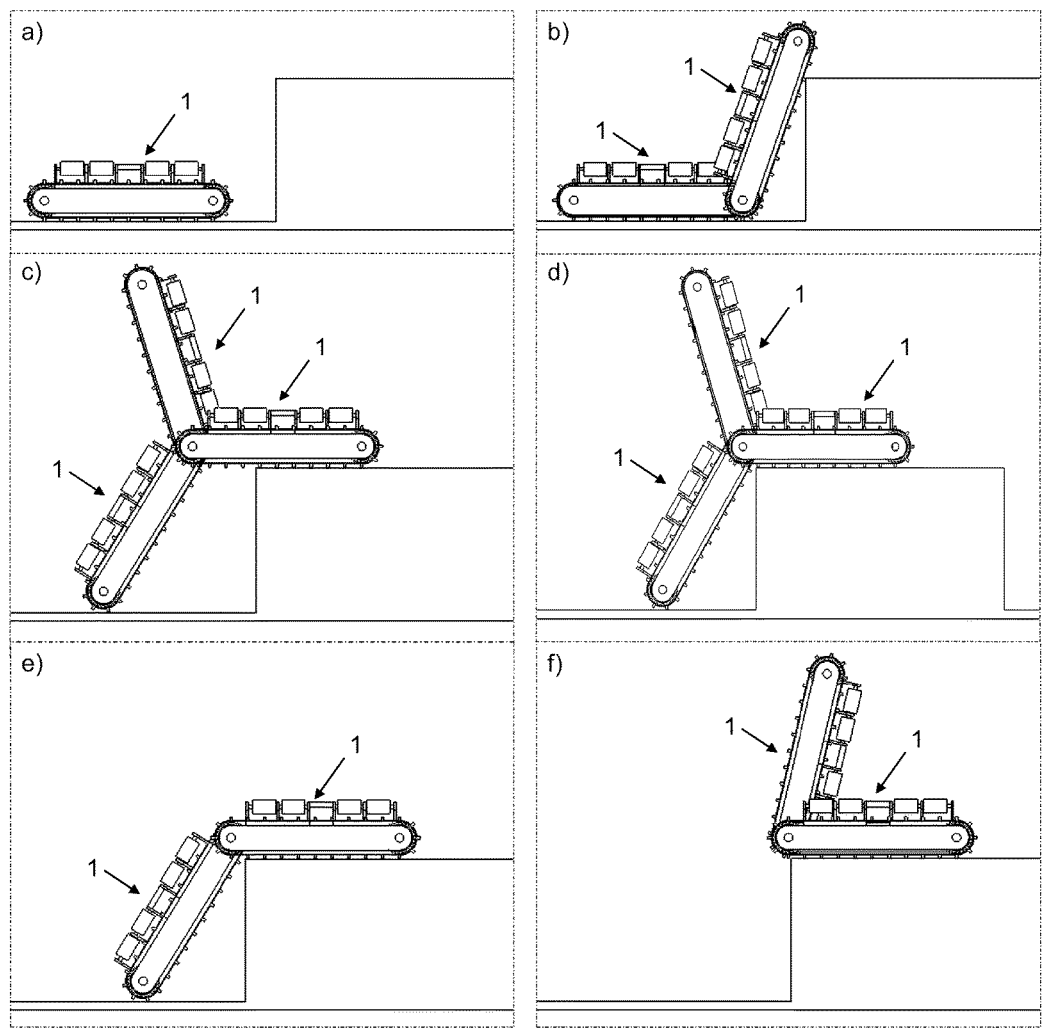
FIG. 23 shows a sequence of maneuvers that a configuration with three modules can execute to climb a short obstacle whose height is less than the length of an individual module.
Figure 24:
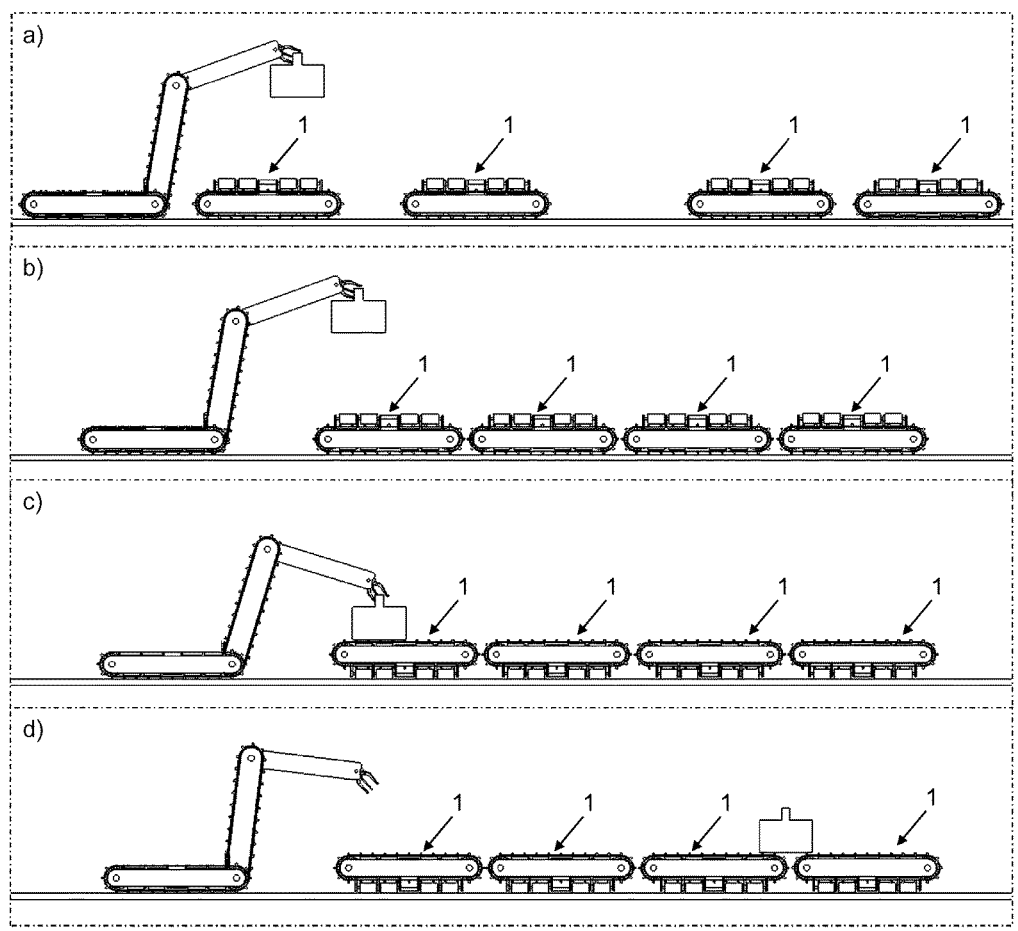
FIG. 24 shows a sample arrangement of locomotion modules that can execute to deploy a discretized conveyor configuration and transport an object from the timing belts of the first module to the timing belts of the last module.

The sample morphology in FIG. 21 enables the execution of tasks in an unstructured environment, as illustrated schematically in FIG. 22-24: Stair Descending (FIG. 22), Climbing a Short Obstacle (FIG. 23), Conveying Objects in a Teamwork Effort (FIG. 24). In FIG. 24, the modules 1 are moved together in an end-to-end relationship to form a single line, FIG. 24(*a*), (*b*). The wheels are then lowered to be out of the way, FIG. 24(*c*). Objects can then be placed on the tracks and moved along the tracks in a conveyor belt fashion, FIG. 24(*c*), (*d*).

Figure 26:
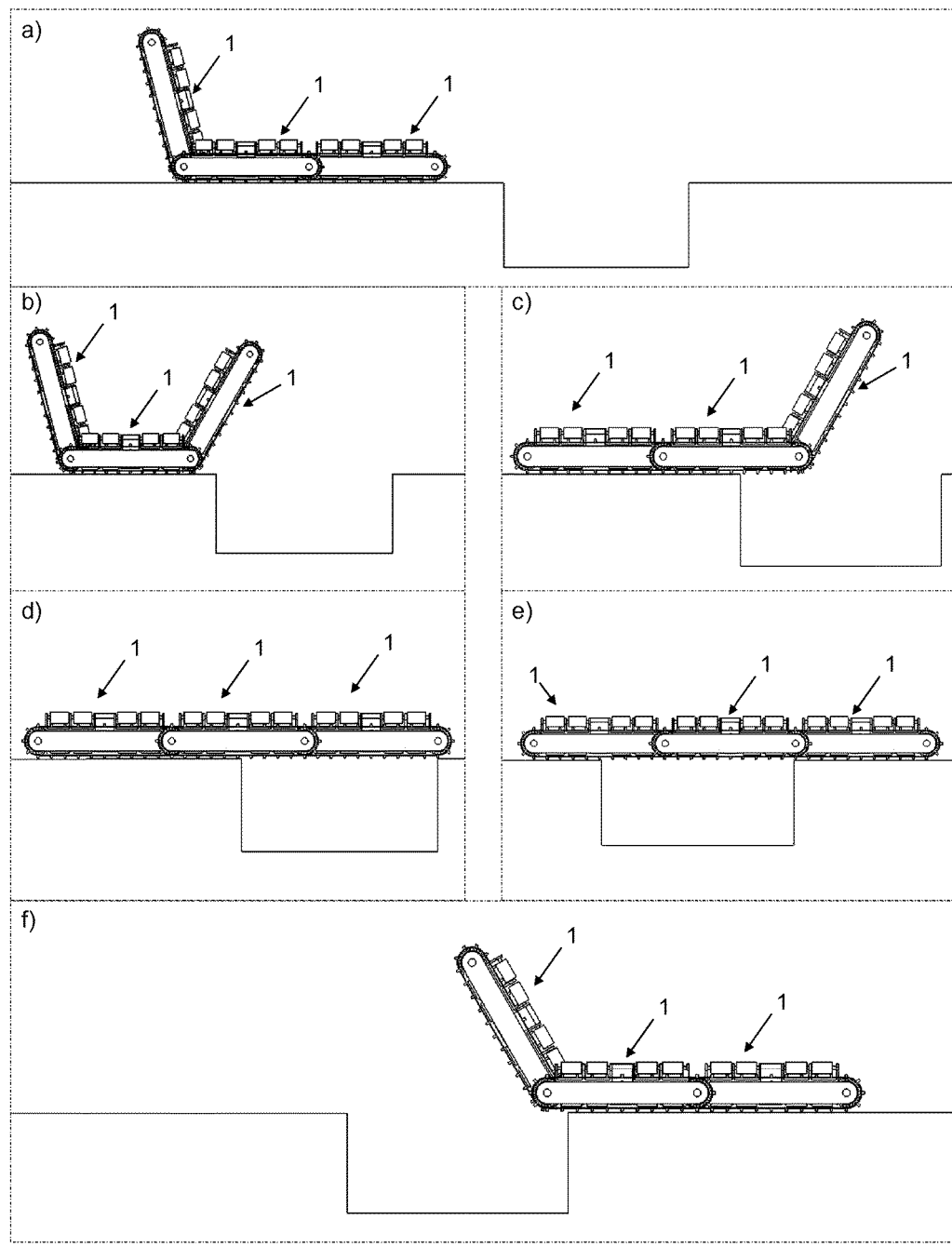
FIG. 26 shows a sequence of maneuvers that a configuration with four locomotion modules can execute to cross a large ditch whose width is longer than the length of an individual module.
Figure 27:
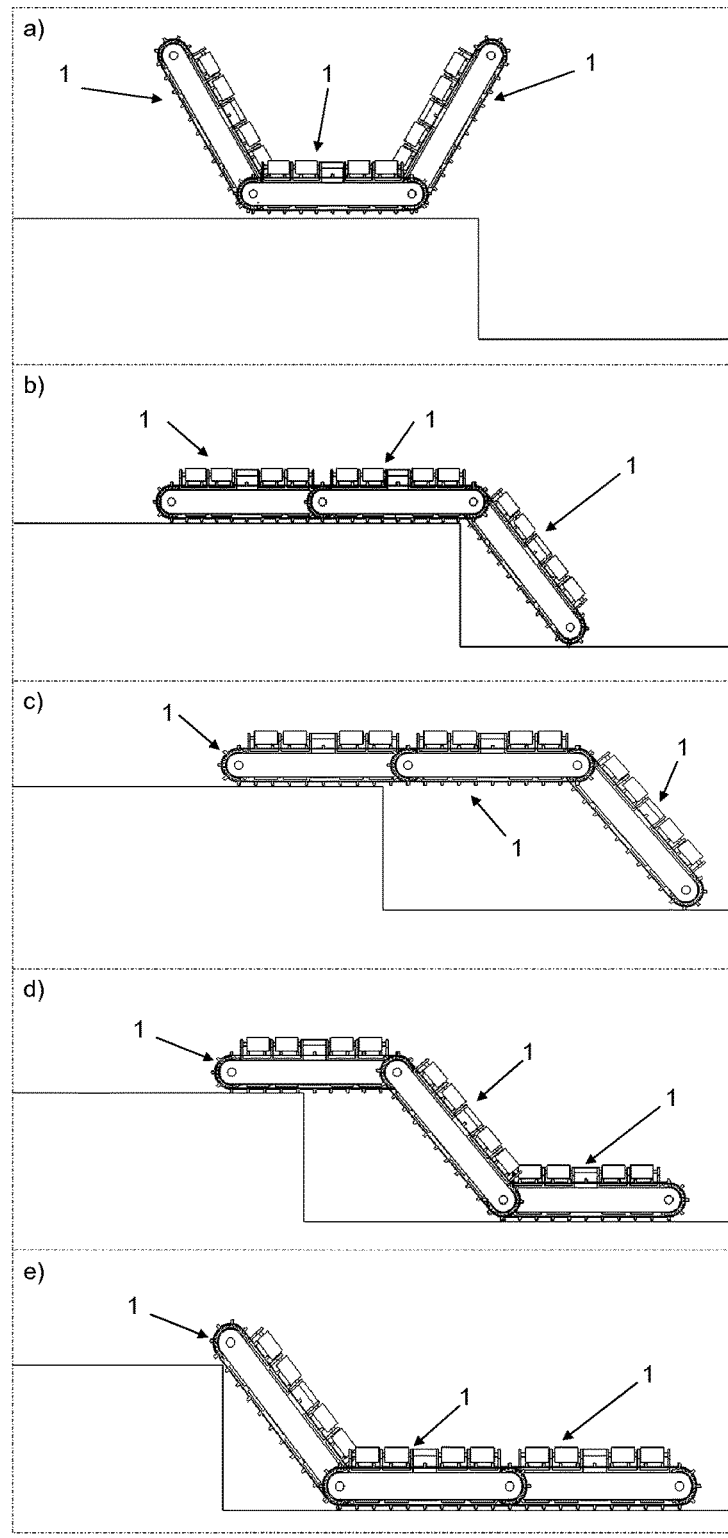
FIG. 27 shows a sequence of maneuvers that a configuration with four locomotion modules can execute to descend an obstacle.

Another non-limiting sample morphology depicted in FIG. 25 involves the docking of four modules instead of three. In this configuration, two central locomotion modules 1 dock with one locomotion module 1 in the front, and one locomotion module 1 in the back carrying two C-Mech's 22 at the docked extremity and a T-Mech 21 at the free extremity. The resulting configuration inherits the invertible morphology and the omni-directional mobility of the individual modules, and can be employed for crossing wide trenches (FIG. 26) that the configuration of FIG. 21 may be unable to traverse due to size limitations. This configuration can also descend steps or the like, FIG. 27.

Optimal Configuration

As shown and described, the invention is a robot which is a vehicle type device. The preferred dimension of a locomotion module is 400-450 mm in length, 200-250 mm in width and 70-90 mm in height. The weight of this module should not exceed 10 Kg. The speed of the locomotion module will top at about 1.5-2 m/s at a peak torque of 10-15 N.m. A torque of 30-50 Nm at a speed of 30 Deg/s will be available at the revolute joint created by the T-Mech shaft and the C-Mech clamps of the docking interface. It should be understood, however, that the invention is not limited to the dimensions of this illustrative embodiment, and that dimensions much larger or smaller than the preferred embodiment can be utilized within the spirit and scope of the present invention.

The present invention represents a modular robot that is tailored towards operations on rugged terrains, in a real, unstructured or urban environment. More specifically, STORM can be of particular importance to military applications, including all operations executed on rugged terrain (reconnaissance missions in mountainous topographies, information retrieval) and all operations deemed too dangerous for soldiers to execute (explosive ordinance and bomb disposal). STORM can equally impact civilian applications that require adaptability in shape and size in response to changes in terrain dynamics. For instance, for search and rescue operations in the aftermath of an earthquake, individual modules can be funneled through voids in collapsed structures for initial inspection, while larger structures can be docked with manipulation for clearing rubbles ahead of rescuers on unstable remains.

For space applications where human intervention is not possible, the modular aspect of STORM, and the ability to self-repair by undocking faulty modules and docking standby modules on a rugged non-flat terrain typical of planetary environments, can impact the longevity of exploration missions where a failure of one system is autonomously repaired without impacting the progress of the mission. Other applications at the module's level include mobility assistive devices, where the locomotion module constitutes a fundamental mobility mechanism for wheelchair technology. With its wheeled/tracked locomotion mechanism and omni-directional mobility, the locomotion module improves the maneuverability of wheelchairs in a congested environment, such as inside public transportation systems, and increases the reliability of this technology for outdoor applications where the failure of one mobility mechanism is compensated by the deployment of the other.

The present invention provides a modular robotic architecture with locomotion modules and docking interfaces tailored for executing operations in a real environment, specifically in conditions that are deemed dangerous for humans, such as warzones, disaster zones and space. The invention can also operate as a mobility assistive device that uses the locomotion module as a fundamental mobility mechanism, taking advantage of its omni-directional mobility and independent wheeled/tracked locomotion capabilities. The invention also provides self-contained tri-state (i.e., drive mode, clamp mode and neutral mode) docking interfaces that use the T-Mech/C-Mech fundamental technology to dock systems together and distribute motor torque. These can be modular robots or even space shuttles in orbit.

It should be appreciated that the present invention has been described utilizing non-limiting illustrative embodiments. Other suitable configurations will be apparent within the spirit and scope of the invention. For instance, though the manipulation module has been described as having C-Mech only to mate with the T-Mech of the locomotion modules, it will be apparent that the manipulation module can have a T-Mech and mate with a C-Mech of the locomotion module.

The present invention provides a number of advantages. For instance, the present invention can operate in a real environment and execute realistic missions, rather than use in ideal laboratory environments. This is because the invention has practical mobility patterns and an uncomplicated docking interface. The invention provides a reliable and rigid docking that enables the assembled configuration to carry a meaningful load, or execute a practical mission, such as manipulating an object. STORM has the intrinsic ability to operate on rugged terrain and can reconfigure its morphology in response to changes in the unstructured environment. STORM docking interface further allows the execution of meaningful missions due to the inherent rigidity that the docking interface provides as a consequence of the non-back-drivability of lead screws.

The present invention allows for realistic docking, which is an intricate maneuver to execute under real-time constraints as it involves alignment in a three dimensional space. The urban environment in which these robots operate is very unstructured to the point where perfect conditions may never exist. STORM copes with these challenges by providing omni-directional mobility along three orthogonal axes. The omni-directional mobility of the locomotion module is designed to enable two adjacent modules to align along the three orthogonal axes of a Cartesian system prior to docking. The orientation of one module with respect to the other are adjusted using the differential drive capabilities of the wheeled and tracked units, while the positioning of the T-Mech and the C-Mech are adjusted in the three dimensional space using the forward, lateral and vertical displacement capabilities of the locomotion module. The omni-mobility allows STORM modules to align axes in a spatial frame using the wheels unit for vertical and lateral alignment, and the tracked units for longitudinal alignment. These characteristics enable STORM to execute alignment maneuvers on a rugged non-flat and realistic terrain such as the terrain of an unstructured urban environment.

Omni-directional mobility, as opposed to uni-directional mobility, enables superior maneuverability in narrow spaces, in tight corners and congested environments. STORM benefits from these advantages by implementing a motorized mechanism (TOG) that enables omni-directional mobility as a direct consequence of the implementation of the docking interface. This mobility allows STORM locomotion modules and subsequent configurations to move in the longitudinal and lateral direction without any prior internal steering, thus providing greater mobility in narrow spaces, such as inside the nibbles created by the aftermath of an earthquake.

The locomotion modules of STORM are equipped with a mobility mechanism that includes tracked units actuated independently from wheeled units. STORM provides these capabilities in a scheme where each mechanism is independent from the other. This augments the fault tolerance of STORM when it comes to mobility, where the failure of one mobility mechanism is compensated by the deployment of the other mechanism.

STORM possesses the ability to reconfigure and scale its morphology in a number of configurations that are not exclusively limited to deploying different locomotion approaches, but also encompass scalability at the locomotion level. Some of these configurations have been provided as non-limiting illustrative embodiments, and discussed in reference to FIGS. 21-27.

The applications for the disclosed technology include civilian search and rescue, military reconnaissance and intelligence on rough terrain, medical assistive devices, and space exploration and docking. That includes modular robotic architecture with locomotion modules and docking interfaces tailored for executing operations for conditions that require real-time assembly of modules and in real environments that are deemed dangerous for humans. These environments include warzones, disaster zones and space. The applications also include mobility assistive devices that use the locomotion module as a fundamental mobility mechanism, taking advantage of its omni-directional mobility and wheeled/tracked locomotion capabilities. And, the applications include self-contained Tri-State docking interfaces that use the T-Mech/C-Mech fundamental technology to dock systems together and distribute motor torque and power. These systems are modular robots or even space shuttles in orbit.

The operation of STORM can be controlled by wireless connection to a remotely located computer. STORM can be provided with a processor which operates under control of software (stored in memory) and sensors to automatically control docking of modules 1.

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A vehicle module for engaging an elongated shaft extending from a mating vehicle module, the elongated shaft having a neck with a cross-section which is non-uniform, the vehicle module comprising:
    a clamping mechanism having opposing clamps which in an opened position receive the shaft and in a closed position define an opening matching the cross-section of the neck of the elongated shaft;
    a mechanism connected to said clamping mechanism configured to move the clamps between the opened position and the closed position, whereby the clamps engage the neck of the elongated shaft in the closed position so that the shaft is fixed with respect to the clamping mechanism;
    wherein the shaft cannot rotate with respect to the clamping mechanism when the clamping mechanism is in the closed position; and,
    wherein the vehicle module has a front, rear and sides, and the shaft is received by the clamping mechanism at a side of said vehicle module and said vehicle module can be rotated with respect to the mating vehicle module by rotating the clamping mechanism.

2. The vehicle module of claim 1, further comprising a drive mechanism, wherein in a drive mode the clamping mechanism is in the open position and engages the drive mechanism to drive the vehicle module, wherein the clamping mechanism is disengaged from the drive mechanism in the closed position, and wherein the clamping mechanism is disengaged from the drive mechanism and from the shaft in a neutral position between the open position and the closed position.

3. The vehicle module of claim 2, wherein the clamps have an outer circumference which is semi-circular and has an outer surface with teeth, and said drive mechanism includes a gear with teeth which mate with the clamp teeth.

4. The vehicle module of claim 1, wherein the mechanism in one embodiment comprises:
   a lead screw;
   a nut coupled to the lead screw;
   at least one arm attached to the nut and to each of the clamps; and
   a motor configured to turn the lead screw to move the nut with respect to the screw to move the clamps between the open position and the closed position.

5. The vehicle module of claim 1, wherein the mating vehicle comprises:
   a first pulley and a second pulley;
   the elongated shaft extending from and coupled with said first pulley and said second pulley, said shaft having a rack with teeth;
   a pinion coupled with the rack of said shaft and configured to move said shaft to extend outward from said first pulley in a direction opposite said second pulley.

6. The vehicle module of claim 5, wherein said first pulley and said second pulley receive a track configured to drive the vehicle module and said first pulley is an active or passive pulley.

7. The vehicle module of claim 5, wherein said shaft has a head at a distal end of said shaft, and the neck is narrower than said head and further the said neck is configured to be engaged by the clamping mechanism of the mating vehicle module.

8. The vehicle module of claim 1, wherein the mechanism comprises:
   an arm;
   a first link connected at one end to the arm and at an opposite end to one of the clamps; and
   a second link connected at one end to the arm and at an opposite end to the other one of the clamps, wherein the first and second links move the clamps in response to movement of the arm.

9. The vehicle module of claim 8, further comprising a drive mechanism, wherein in a drive mode the clamping mechanism is in the open position and engages the drive mechanism to drive the vehicle module, wherein the clamping mechanism is disengaged from the drive mechanism in the closed position, and wherein the clamping mechanism is disengaged from the drive mechanism and from the shaft in a neutral position between the open position and the closed position.

10. The vehicle module of claim 9, further comprising a worm and worm gear assembly configured to transmit motor torque to the arm and ensure the non-back-drivability of the clamps in the drive mode, in the neutral position and in the closed position.

11. A vehicle module for engaging a clamping mechanism from a mating vehicle module, the vehicle module comprising:
    a first pulley and a second pulley;
    a shaft extending from and coupled with said first pulley and said second pulley, said shaft having a rack with teeth;
    a pinion coupled with the rack of said shaft and configured to move said shaft to extend outward from said first pulley in a direction opposite said second pulley;
    wherein said first pulley and said second pulley receive a track configured to drive the vehicle module wherein said first pulley is an active or passive pulley; and,
    wherein said shaft has a head and a narrow neck and said neck is configured to be engaged by a clamping mechanism of the mating vehicle module; and,
    wherein the vehicle module has a front, rear and sides, and the shaft is extended from a side of said vehicle module and said vehicle module can be rotated with respect to the mating vehicle module by rotating the clamping mechanism.

12. A method for docking a first vehicle module to a second vehicle module, said method comprising:
    providing the first vehicle module with omni-directional movement, whereby the first vehicle module can move in a first direction or a second direction orthogonal to the first direction;
    providing the first vehicle module with a clamping mechanism at a side of the first vehicle module as a first mating adapter;
    providing the second vehicle module with an elongated shaft at a side of the second vehicle module as a second mating adapter configured to mate with the clamping mechanism;
    aligning the clamping mechanism with the elongated shaft in the first direction by moving either the first vehicle module or the second vehicle module so that the first vehicle module is parallel to the second vehicle module;
    raising the first vehicle module to align the clamping mechanism with the elongated shaft in a third direction; and
    moving the first vehicle module in the second direction toward the second vehicle module to engage the clamping mechanism with a neck of the elongated shaft; wherein the first and second vehicle modules can be rotated with respect to each other by rotating the clamping mechanism.

* * * * *